(12) United States Patent
Roy et al.

(10) Patent No.: US 12,348,323 B2
(45) Date of Patent: Jul. 1, 2025

(54) POWER DISTRIBUTION AND DATA ROUTING IN A NETWORK OF DEVICES INTERCONNECTED BY HYBRID DATA/POWER LINKS

(71) Applicant: GENETEC INC., Saint-Laurent (CA)

(72) Inventors: Danny Roy, Montreal (CA);
Louis-Philippe Brais, Montreal (CA);
Jean-Yves Pikulik, Montreal (CA)

(*) Notice: Subject to any disclaimer, the term of this patent is extended or adjusted under 35 U.S.C. 154(b) by 0 days.

(21) Appl. No.: 18/226,812

(22) Filed: Jul. 27, 2023

(65) Prior Publication Data
US 2024/0014853 A1    Jan. 11, 2024

Related U.S. Application Data

(63) Continuation of application No. 17/211,404, filed on Mar. 24, 2021, now Pat. No. 11,770,155, which is a
(Continued)

(51) Int. Cl.
*H04L 12/10* (2006.01)
*H02J 1/00* (2006.01)
(Continued)

(52) U.S. Cl.
CPC ............... *H04L 12/10* (2013.01); *H02J 1/00* (2013.01); *H04B 3/542* (2013.01); *H04B 3/548* (2013.01); *H04L 41/12* (2013.01); *H04L 47/821* (2013.01)

(58) Field of Classification Search
CPC .......... H02J 1/00; H04L 47/821; H04L 41/12; H04L 49/15; Y04S 40/00
See application file for complete search history.

(56) References Cited

U.S. PATENT DOCUMENTS

| 1,655,904 A | * | 1/1928 | Hott | H01B 7/368 40/666 |
| 2,974,147 A | * | 3/1961 | Marschall | C07C 33/44 549/349 |

(Continued)

FOREIGN PATENT DOCUMENTS

| CA | 3214510 A1 | * | 9/2022 | H02J 1/00 |
| CN | 118194570 A | * | 6/2024 | |

(Continued)

OTHER PUBLICATIONS

International Preliminary Report on Patentability Chapter 1 issued on Sep. 12, 2023 in connection with with International Patent Application No. PCT/CA2022/050439, 4 pages.
(Continued)

*Primary Examiner* — Berhanu Tadese

(57) ABSTRACT

A method for execution in a central controller comprises obtaining an interconnection topology for a plurality of nodes interconnected via hybrid data/power links; obtaining a power distribution map associated with the topology; and causing DC power to be distributed to the nodes via the links according to the power distribution map. Also, such a node in which there is at least one power-receiving port and at least one power-transmitting port, a controller and power switching circuitry. The controller operates based on power drawn from a portion of the DC power received via the power-receiving port. The controller determines a destination of data packets received via any of the ports and outputting those of the received data packets that are not destined for the network device via another one of the ports. The controller also causes the power switching circuitry to output via plural power-transmitting ports respective portions of the received DC power received at the power-receiving port.

21 Claims, 15 Drawing Sheets

Related U.S. Application Data continuation-in-part of application No. 16/879,631, filed on May 20, 2020, now Pat. No. 11,611,446.

(60) Provisional application No. 63/027,195, filed on May 19, 2020.

(51) Int. Cl.
*H04B 3/54* (2006.01)
*H04L 41/12* (2022.01)
*H04L 47/70* (2022.01)

(56) References Cited

U.S. PATENT DOCUMENTS

| | | | |
|---|---|---|---|
| 6,748,458 B2* | 6/2004 | Andrewartha | G06F 1/189 |
| | | | 710/305 |
| 7,555,566 B2* | 6/2009 | Blumrich | F04D 25/166 |
| | | | 709/200 |
| 8,250,133 B2* | 8/2012 | Blumrich | G06F 15/17381 |
| | | | 709/201 |
| 8,667,049 B2* | 3/2014 | Blumrich | F04D 27/004 |
| | | | 709/248 |
| 9,143,384 B2* | 9/2015 | Yousefi | B60R 16/03 |
| 9,413,195 B2* | 8/2016 | Luebke | H02J 13/00007 |
| 9,667,056 B2* | 5/2017 | Luebke | H02J 13/00004 |
| 9,882,656 B2* | 1/2018 | Sipes, Jr. | H04B 10/40 |
| 10,014,958 B2* | 7/2018 | Sipes, Jr. | G02B 6/4416 |
| 10,171,180 B2* | 1/2019 | Sipes, Jr | H04B 10/077 |
| 10,303,035 B2* | 5/2019 | Brown | H04L 12/4625 |
| 10,334,059 B2* | 6/2019 | Lida | H04L 69/22 |
| 10,855,381 B2* | 12/2020 | Sipes, Jr. | H04L 12/10 |
| 10,957,170 B2* | 3/2021 | Racz | G08B 25/08 |
| 11,016,357 B2* | 5/2021 | Brown | G02F 1/153 |
| 11,055,615 B2* | 7/2021 | Litichever | H04L 12/40 |
| 11,067,869 B2* | 7/2021 | Brown | H04L 12/2803 |
| 11,251,695 B2* | 2/2022 | Lambert | H02M 3/156 |
| 11,314,139 B2* | 4/2022 | Brown | G02F 1/163 |
| 11,611,446 B2* | 3/2023 | Roy | H04L 49/15 |
| 11,741,801 B2* | 8/2023 | Racz | H04L 63/0245 |
| | | | 726/4 |
| 11,770,155 B2* | 9/2023 | Roy | H04L 41/12 |
| | | | 375/257 |
| 11,822,159 B2* | 11/2023 | Brown | H04L 12/2803 |
| 2006/0149978 A1* | 7/2006 | Randall | G06F 1/3215 |
| | | | 713/300 |
| 2007/0041387 A1* | 2/2007 | Ghoshal | H04L 12/10 |
| | | | 370/395.52 |
| 2008/0168283 A1* | 7/2008 | Penning | G06F 1/263 |
| | | | 713/310 |
| 2010/0049998 A1* | 2/2010 | Karam | H04L 12/10 |
| | | | 713/300 |
| 2010/0274927 A1* | 10/2010 | Bobrek | H04L 12/10 |
| | | | 713/300 |
| 2011/0320833 A1* | 12/2011 | R. | H04L 12/12 |
| | | | 713/310 |
| 2015/0127957 A1* | 5/2015 | Sethi | G06F 1/26 |
| | | | 713/300 |
| 2015/0256748 A1* | 9/2015 | Herzel | G06F 1/30 |
| | | | 348/372 |
| 2015/0311752 A1* | 10/2015 | Luebke | H02J 13/00007 |
| | | | 361/63 |
| 2016/0308348 A1* | 10/2016 | Luebke | H02H 3/38 |
| 2017/0068307 A1* | 3/2017 | Vavilala | G06F 1/266 |
| 2017/0187469 A1* | 6/2017 | Sipes, Jr. | G02B 6/3817 |
| 2018/0019884 A1* | 1/2018 | Radermacher | H04L 12/2807 |
| 2019/0155122 A1 | 5/2019 | Brown et al. | |
| 2019/0229934 A1* | 7/2019 | Zhuang | G06F 1/266 |
| 2021/0367642 A1* | 11/2021 | Roy | H04B 3/542 |
| 2023/0208661 A1* | 6/2023 | Roy | H04L 49/15 |
| | | | 375/257 |
| 2024/0014853 A1* | 1/2024 | Roy | H04L 47/821 |

FOREIGN PATENT DOCUMENTS

| | | | | |
|---|---|---|---|---|
| EP | 1370966 | B1 * | 8/2010 | F04D 25/166 |
| EP | 2974147 | A1 | 1/2016 | |
| EP | 3266150 | B1 * | 1/2019 | G06F 1/266 |
| EP | 3512160 | A1 | 7/2019 | |
| EP | 3512160 | B1 * | 7/2020 | G06F 1/266 |
| EP | 4035313 | | 8/2022 | |
| EP | 4035313 | A1 * | 8/2022 | H04L 12/10 |
| EP | 4315543 | | 2/2024 | |
| WO | WO-02084509 | A1 * | 10/2002 | F04D 25/166 |
| WO | WO-2015167706 | A1 * | 11/2015 | H01H 83/20 |
| WO | 2017208186 | | 2/2017 | |
| WO | WO-2017117670 | A1 * | 7/2017 | G08B 13/196 |
| WO | WO-2017208186 | A3 * | 1/2018 | A61B 17/00 |
| WO | 2018104929 | | 6/2018 | |
| WO | WO-2019173094 | A1 * | 9/2019 | G02B 6/3817 |
| WO | WO-2021056094 | A1 * | 4/2021 | H04L 12/10 |
| WO | WO-2022198324 | A1 * | 9/2022 | H02J 1/00 |

OTHER PUBLICATIONS

European Search Report ssued on Sep. 27, 2023 by the EPO in connection with European Patent application No. 20868849.9, 7 pages.

Office Action issued by the USPTO on Oct. 26, 2023 in connection with U.S. Appl. No. 17/244,588, 32 pages.

Examiner's Report issued in connection with CA Patent Application No. 3, 120,654 on Dec. 4, 2023, 4 pages.

Notice of Allowance issued on Dec. 19, 2023 by the EPO in connection with European Patent application No. 19887841.5, 9 pages.

Examiner's Report issued in connection with CA Patent Application No. 3,155,694 on Jan. 16, 2024, 3 pages.

Advisory Action issued by the USPTO on Mar. 6, 2024 in connection with U.S. Appl. No. 17/244,588, 4 pages.

Office Action issued by the USPTO on Jul. 18, 2024 in connection with U.S. Appl. No. 18/111,786, 9 pages.

Notice of Allowance issued on Sep. 29, 2024 by the USPTO in connection with U.S. Appl. No. 18/111,786, 22 pages.

Office Action issued by the USPTO on Nov. 5, 2024 in connection with U.S. Appl. No. 17/244,588, 23 pages.

Examiner's Report issued in connection with CA Patent Application No. 3,155,694 on Nov. 21, 2024, 3 pages.

European Search Report issued on Oct. 15, 2024 by the EPO in connection with European Patent application No. 24178523.7, 12 pages.

\* cited by examiner

| Node 115A | | |
|---|---|---|
| Destination node | Priority | Output port |
| 115B | HI | Port 132B |
| 115C | LO | Port 132B |
| 115D | HI | Port 132B |
| 115E | LO | Port 132B |
| 115F | LO | Port 132B |
| 115G | HI | Port 132B |
| 115H | LO | Port 132B |

505A

| Node 115B | | |
|---|---|---|
| Destination node | Priority | Output port |
| 115C | LO | Port 132D |
| 115D | MED | Port 132C |
| 115E | HI | Port 132C |
| 115F | HI | Port 132C |
| 115G | LO | Port 132B |
| 115H | HI | Port 132B |
| 115A | MED | Port 132A |

POWER DISTRIBUTION AND DATA ROUTING IN A NETWORK OF DEVICES INTERCONNECTED BY HYBRID DATA/POWER LINKS

CROSS-REFERENCE TO RELATED APPLICATIONS

The present application is a continuation of U.S. patent application Ser. No. 17/211,404, filed on Mar. 24, 2021 which is a continuation-in-part of U.S. patent application Ser. No. 16/879,631, filed on May 20, 2020. The present application also claims the benefit under 35 U.S.C. 119(e) of U.S. Provisional Patent Application No. 63/027,195, filed on May 19, 2020. The present application is also related to U.S. Provisional Patent Application Ser. No. 62/904,852, filed on Sep. 24, 2019. The contents of the aforementioned applications are hereby incorporated herein by reference.

FIELD

The present disclosure relates generally to power and data distribution over networks.

BACKGROUND

Power-over-Ethernet (PoE) is becoming increasingly popular as a way to provide both power, data collection and control capabilities to digital devices such as lights, sensors and cameras. One advantage of PoE is the absence of a need for a nearby outlet or standalone power source. Rather, the power is supplied to the digital device over a 4-conductor hybrid data/power cable. This same cable is used for exchanging data signals with the digital device. Different frequencies are used for the power and the data signals.

Typically, a PoE-enabled device is either a PoE source (PSE) or a PoE load (PD). Power requirements of a PoE load are typically negotiated with the PoE source using an IEEE standard protocol over a hybrid data/power cable that connects the two devices. This works well for 1-to-1 connections between the PoE source and the PoE load. However, as the power made available by a PoE source increases with advances in technology, there is enough power to supply multiple PoE loads. At this point, the use of a dedicated cable per PoE load becomes inefficient and unwieldy.

It would therefore be of benefit to power multiple PoE loads from a hybrid data/power cable emanating from a PoE source. In particular, it would be of benefit to power an arbitrarily configured (e.g., mesh) network of PoE loads, each with its own power demands and data communication requirements.

SUMMARY

According to an aspect of the present disclosure, a method for execution in a controller device comprises obtaining an interconnection topology for a plurality of network devices interconnected via hybrid data/power links; obtaining a power distribution map associated with the interconnection topology; and causing DC power to be distributed to the network devices via the hybrid data/power links according to the power distribution map.

According to another aspect of the present disclosure, a non-transitory computer-readable storage medium comprises instructions which, when carried out by a processor of a controller device, cause the controller device to carry out the aforesaid method.

According to a further aspect of the present disclosure, a controller device comprises a first hybrid data/power port for connection to a first network device; a processor; and a memory storing instructions for execution by the processor. The processor is configured to execute the instructions and carry out a method that comprises obtaining an interconnection topology for a plurality of network devices interconnected via hybrid data/power links, the interconnection topology including the first network device and the first hybrid data/power link; obtaining a power distribution map associated with the interconnection topology; and causing DC power to be distributed to the network devices via the hybrid data/power links according to the power distribution map.

According to another aspect of the present disclosure, a method of operating a computing device comprises implementing a graphical user interface configured for: (i) receiving from a user a specification of a plurality of network devices, including bandwidth and power requirements for the network devices, an interconnection topology of the network devices and a logical network involving the network devices; and (ii) graphically displaying the interconnection topology and the logical network; and causing transmission of signals to a central controller, the signals being indicative of the bandwidth and power requirements for the network devices, the interconnection topology and the logical network.

According to another aspect of the present disclosure a non-transitory computer-readable storage medium comprises instructions which, when carried out by a processor of a computing device, cause the computing device to carry out a method. The method comprises implementing a graphical user interface configured for: (i) receiving from a user a specification of a plurality of network devices, including bandwidth and power requirements for the network devices, an interconnection topology of the network devices and a logical network involving the network devices; and (ii) graphically displaying the interconnection topology and the logical network; and causing transmission of signals to a central controller, the signals being indicative of the bandwidth and power requirements for the network devices, the interconnection topology and the logical network.

According to another aspect of the present disclosure, a network includes a plurality of network devices; and a plurality of hybrid data/power links interconnecting the network devices in accordance with a topology. The network devices are configured to distribute DC power throughout the topology in accordance with a power distribution map received from a central controller. The network devices are configured to route data throughout the topology in accordance with a data routing map received from the central controller.

According to another aspect of the present disclosure, a network device comprises a plurality of ports connectable to hybrid data/power links for the transport of DC power and data packets, at least one of the ports being a power-receiving port or ports for the network device and the remaining port or ports being power-transmitting port or ports for the network device; and a controller operatively coupled to the ports and comprising power switching circuitry. The controller operates based on power drawn from a portion of the DC power received via the power-receiving port or ports. The controller is configured for determining a destination of data packets received via any of the ports and outputting those of the received data packets that are not destined for the network device via another one of the ports. The controller is further configured for causing the power switching circuitry to output via the power-transmitting port or ports respective portions of the received DC power received at the power-receiving port or ports and not drawn by the controller for operation thereof.

According to another aspect of the present disclosure, method is carried out by a controller of a network device, the network device comprising at least a controller operatively coupled to a plurality of ports connectable to hybrid data/power links for the transport of DC power and data packets, at least one of the ports being a power-receiving port or ports for the network device and the remaining port or ports being power-transmitting port or ports for the network device. The method comprises outputting via the power-transmitting port or ports respective portions of the received DC power received at the power-receiving port or ports that is not drawn by the controller for operation thereof, and determining a destination of data packets received via any of the ports and outputting those of the received data packets that are not destined for the network device via another one of the ports.

BRIEF DESCRIPTION OF THE DRAWINGS

For a more complete understanding of the present embodiments, reference is now made, by way of example, to the following description taken in conjunction with the accompanying drawings, in which:

FIG. 5 illustrates routing tables for two nodes that indicate towards which port to send incoming data packets that are not destined for that node.

DETAILED DESCRIPTION

Aspects of the present disclosure relate to controlling power distribution and data routing in a network of devices that are interconnected by hybrid data/power links. Power distribution and data routing can occur independently of each other. Power is distributed in accordance with a power distribution map, causing power to be supplied to some devices while simply transiting other devices within the same physical network, except for a small amount that is consumed to allow the device to carry out certain basic functionalities. Meanwhile, data packets can be routed among devices according to a data routing map, irrespective of the power distribution map.

As referred to herein, a "hybrid data/power link" can be used to connect (i) a first device that is a source of DC power for a second device and is also potentially a source and/or consumer of data, and (ii) the aforementioned second device, which is a recipient of that DC power and is also potentially a source and/or a consumer of some of the aforementioned data. Examples of hybrid data/power links include Ethernet cables suitable for transmitting Power-over-Ethernet (PoE), which refers to a family of standards developed by the Institute of Electrical and Electronics Engineers (IEEE) under IEEE 802.3, hereby incorporated by reference herein. However, the PoE standard is not to be considered a limitation, and it should be understood that the hybrid data/power links referred to herein may be compliant with other standards or implementations for transmitting power and data along the same set of cables.

Figure 2B:
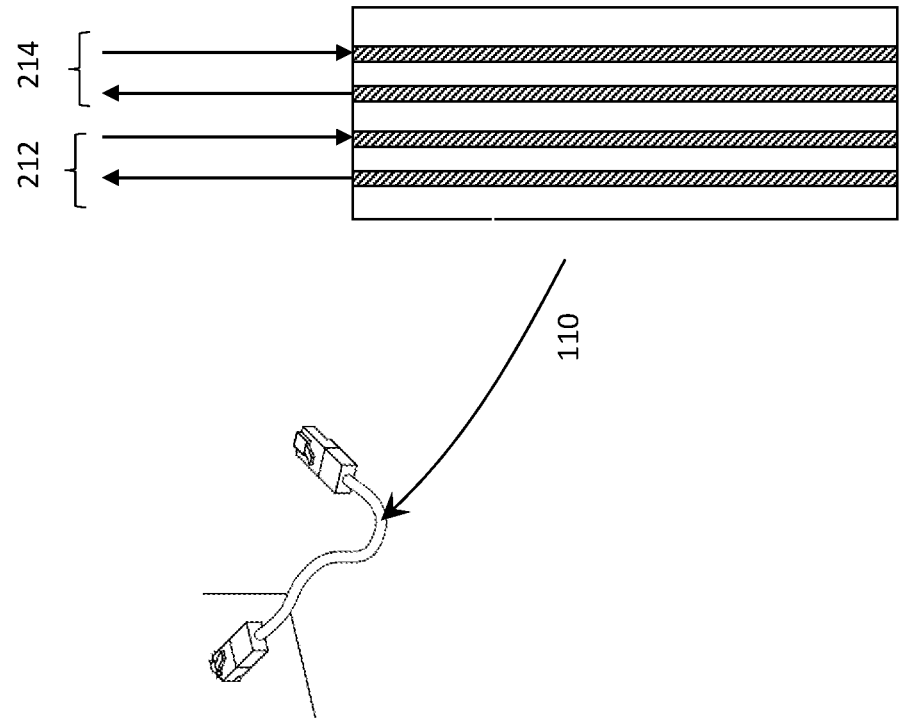
FIG. 2B illustrates a hybrid data/power link with two pairs of conductors, where either or both pairs may carry both DC power and data signals.
Figure 2A:
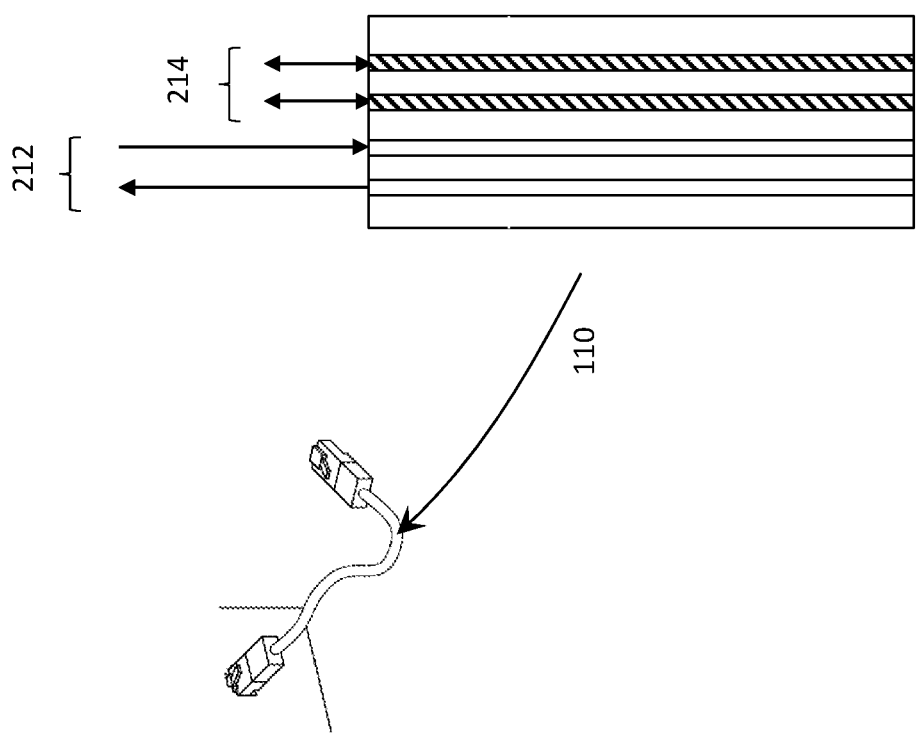
FIG. 2A illustrates a hybrid data/power link with two pairs of conductors, where one pair may be used for DC power and the other pair may be used for data signals.

Referring to FIGS. 2A and 2B, in an example of implementation, a hybrid data/power link can include two pairs of conductors 212 and 214 that carry common-mode DC power and differential-mode higher-frequency data signals, but in a way that differs between the two figures. For example, as shown in FIG. 2A, one pair of conductors 212 may be used to transport DC power and the second pair of conductors 214 may be used to transport data signals. The pair of conductors 214 can be configured to carry data signals only and not to carry DC power whereas the first pair of conductors 212 can be configured to carry DC power only and not carry data signals. The data signals can carry data packets with information of various kinds.

Alternatively, as shown in FIG. 2B, either pair of conductors 212, 214 (or both pairs) carry both DC power and data signals, which means that the data signals travel on at least one pair of the conductors 212, 214. Such a configuration of the hybrid data/power links, whereby conductors are shared for transporting DC power and data signals, is possible due to the data signals occupying a higher frequency range than a lower frequency range (e.g., around zero Hz) occupied by the DC power. The two frequency ranges do not overlap, e.g., the highest frequency in the lower frequency range is lower than the lowest frequency in the higher frequency range. The data signals in the higher frequency range can again carry packets with information of various kinds. In some embodiments, the lower frequency range may go up to several kHz (still without overlapping the higher frequency range) to allow the transmission of certain types of information besides just DC power.

Network Architecture and Components

Figure 1A:
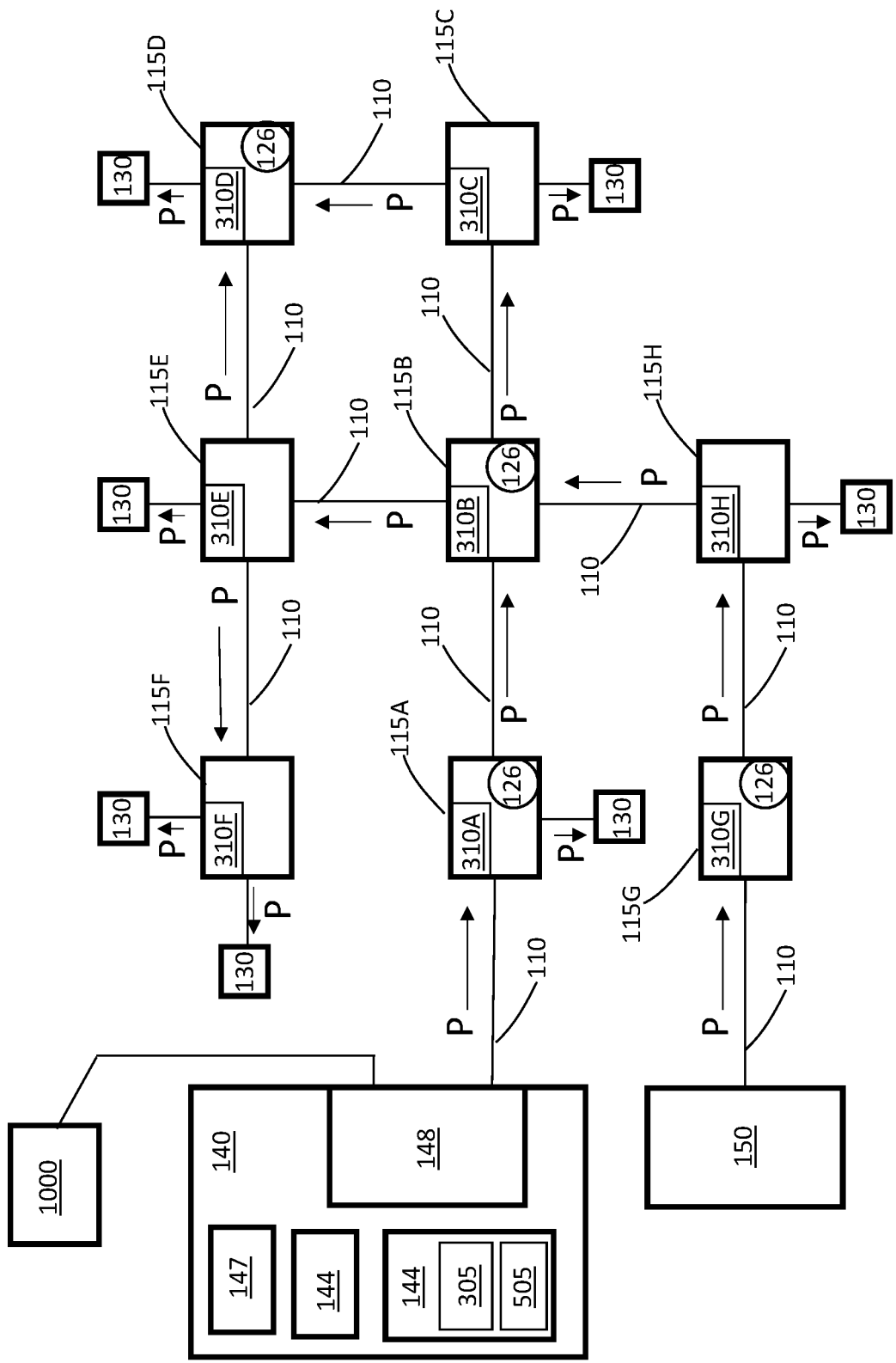
FIG. 1A is a block diagram showing a plurality of devices interconnected by hybrid data/power links in an interconnection topology, in accordance with a non-limiting embodiment.

FIG. 1A shows a plurality of devices 115A-115H, 130, 140, 150 interconnected by hybrid data/power links 110 in a interconnection topology. The devices 115A-115H, 130, 140, are of different types. Specifically, devices 115A-115H are "nodes", devices 130 are "subtending devices", device 150 is a power source and device 140 is a "central controller" (which, in this embodiment, also acts as a power source). Some of these device types will be described in further detail below. Those skilled in the art will appreciate that there is no particular limit on the number of devices, nor is there a particular constraint on the configuration of the interconnection topology as implemented by the hybrid data/power links 110 and the various devices and device types.

Nodes 115A-115H and subtending devices 130 may be powered by DC power received from the central controller 140 or the power source 150 via one or more of the hybrid data/power links 110. A "node" is considered to be a device that is physically reachable via the hybrid data/power links 110 and logically addressable from other nodes using an addressing scheme. A "subtending device" is subtending to a node (referred to as a parent node) and is not logically addressable from other nodes using the addressing scheme used to logically address the nodes. In the interconnection topology of FIG. 1A, the subtending devices 130 are not considered nodes because although they are each physically reachable via a hybrid data/power link 110, they are logically addressable only from their respective parent node (namely, one of nodes 115A, 115C, 115D, 115E, 115F and 115H).

In the illustrated embodiment, each of the subtending devices 130 is connected to its parent node by a hybrid data/power link 110, which allows the subtending device 130 to operate on the basis of electrical DC power received over such hybrid data/power link 110, without the need for an auxiliary power supply (although an auxiliary power supply may be present). In other embodiments, the connection between a subtending device and its parent node may involve a different type of physical link that is not a hybrid data/power link.

Although in the interconnection topology of FIG. 1A, some nodes are shown as being connected to zero subtending devices (e.g., nodes 115B, 115G), some nodes are shown as being connected to a single subtending device (e.g., nodes 115A, 115C, 115D, 115E and 115H) and still other nodes are shown as being connected to two subtending nodes (e.g., node 115F), it should be appreciated that in other embodiments, a given node may be connected to (i.e., be the parent node of) an even greater number of plural subtending devices.

Each of the nodes 115A-115H comprises one or more hybrid data/power ports for receiving and/or transmitting data and power via respective ones of the hybrid data/power links 110 to which that node is connected. It should be noted that DC power is directional through a given node, meaning that each hybrid data/power port either receives power or transmits power. A port of a given node over which power is received by the given node is referred to as a "power-receiving" port; similarly, a port over which power is transmitted out of the given node is referred to as a "power-transmitting" node. A given node may have multiple hybrid data/power ports, which may include more than one power-receiving port and/or more than one power-transmitting port.

As such, a device (e.g., a node or a subtending device) that is connected to a power-transmitting port of a given node is considered to be "downstream" of the given node, and any device connected to a power-receiving port of the given node is considered to be "upstream". The terms "upstream" and "downstream," with respect to the hybrid data/power ports in this context, pertain to an expected direction of power supply; however, they have no bearing on directionality of data flow.

The power-transmitting and/or power-receiving nature of the various hybrid data/power ports of a given node determines if that node is considered to be a "source mode", a "terminal node" or an "intermediate node". Specifically:

A "source node" has one or more power-transmitting ports and no power-receiving ports (or, if it has some, they are unused/inactive).

A "terminal node" has one or more power-receiving ports and no power-transmitting ports (or, if it has some, they are unused/inactive).

An "intermediate node" has one or more actively used power-receiving ports and one or more actively used power-transmitting ports.

It should be appreciated that a node considered to be an intermediate node may become a terminal node if, at some point during operation, it ceases to use any of its power-transmitting ports, and a node considered to be a terminal node may become an intermediate node if it does end up using a previously unused power-transmitting port. Similarly, a node considered to be an intermediate node may become a source node if it ceases to use any of its power-receiving ports, and a node considered to be a source node may become an intermediate node if it does end up using a previously unused power-receiving port.

The nature of a hybrid data/power port as a power-receiving port or power-transmitting port may even vary over time (i.e., it is dynamic), if the node is equipped with specialized circuitry. This may call for a change in the terminology used to refer to a given node, over time.

Figure 1B:
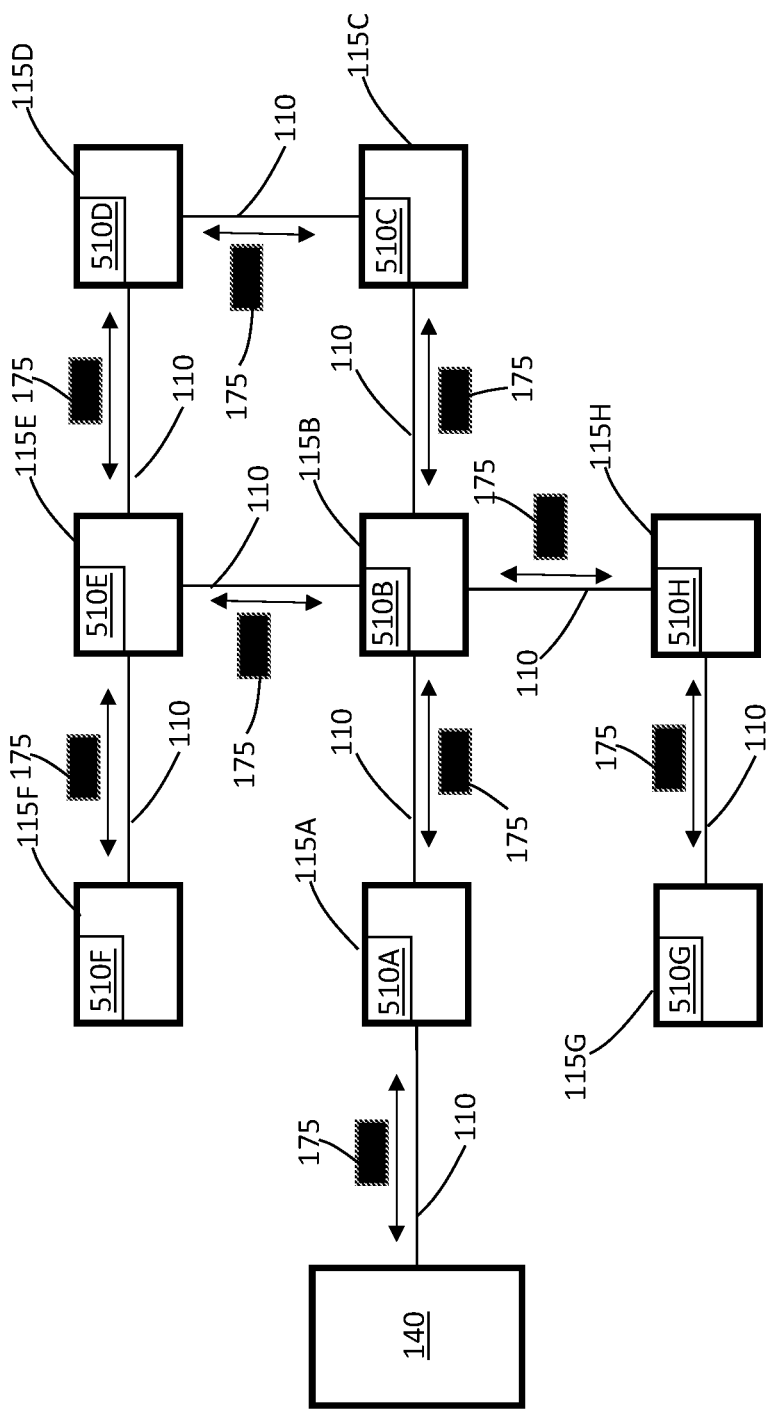
FIG. 1B is a block diagram showing a logical network implemented by the devices of FIG. 1A, in accordance with a non-limiting embodiment.

Nodes 115A-115H are not only part of an interconnection topology, they form a logical network through the exchange of data packets, as shown in FIG. 1B. In this regard, those skilled in the art will appreciate that although DC power is directional through a given node (as shown in FIG. 1A), data packets 175 (see FIG. 1B) can be exchanged bidirectionally via any hybrid data/power port, be it a power-receiving port or a power-transmitting port. This is because the frequency range of data signals carrying data packets between two nodes is different from (e.g., higher than) the frequency range in which power is transmitted from one node to another. For example, as already mentioned, power may be transmitted in DC common mode power whereas the data packets may be exchanged over differential high-frequency data signals.

By way of non-limiting example, the internal configuration of nodes 115G, 115A and 115B will now be described with reference to FIGS. 3A, 3B and 3C, respectively.

Node 115G

Figure 3A:
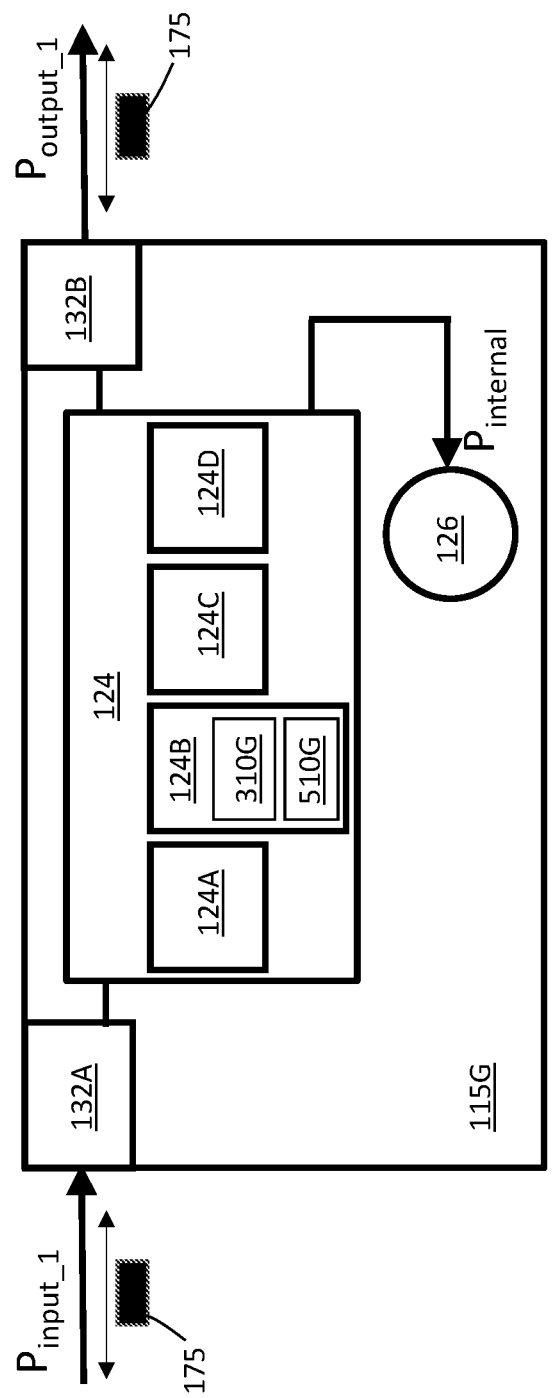
FIGS. 3A to 3C are block diagrams showing different internal configurations of a node, in accordance with various non-limiting embodiments.

With reference to FIG. 3A, node 115G includes two hybrid data/power ports 132A, 132B. Hybrid data/power port 132A is a power-receiving port, since it receives an amount of power $P_{input\_1}$ from the power source 150, whereas hybrid data/power port 132B is a power-transmitting port, since it outputs an amount of power $P_{output\_1}$ to node 115H. Node 115G is an example of an "intermediate node", since its hybrid data/power ports 132A, 132B include one or more hybrid data/power ports actively used in a power-receiving mode (in this case, port 132A) and one or more hybrid data/power ports actively used in a power-transmitting mode (in this case, port 132B).

Node 115G also comprises a so-called "internal device" 126. (Although node 115G includes a single internal device 126, other nodes may be operatively coupled to zero or more than one such internal device.) Examples of an internal device are similar to examples of a subtending device and can include a lighting source, a sensor data collection point, a security camera, to name a few non-limiting possibilities. However, as opposed to a subtending device, an internal device is not connected to a port of a given parent node, but rather is integrated within the node itself.

The internal device 126 requires an amount of power $P_{internal}$ to operate. However, in some embodiments, the internal device 126 may include a battery. This battery may sometimes be used as a load (whereby it is being recharged by drawing power $P_{internal}$ from node 115G), whereas on other occasions it may be desirable to use the battery as a source of power for the node itself or for other nodes. In that case, node 115G, which may heretofore have been considered to be a terminal node or intermediate node, may now be referred to as a source node.

In some instances, one or more of the terminal nodes in the interconnection topology may be designated as a power sink so as to expend excess power, e.g., in the form of heat, light or sound. Details of examples of intermediates node can be found in U.S. application Ser. No. 16/879,631, the contents of which are incorporated herein by reference.

In addition, node 115G comprises a node controller 124 that is connected to the hybrid data/power ports 132A, 132B and to the internal device 126. The node controller 124 may comprise a processor 124A, a memory 124B, power switching circuitry 124C and modulation/demodulation circuitry 124D. The memory 124B stores instructions for execution by the processor 124A. The memory 124B may also store a unique address for node 115G to allow proper addressing by the central controller 140.

The processor 124A of node 115G is configured to interact with the memory 124B, the power switching circuitry 124C and the modulation/demodulation circuitry 124D so as to carry out the following functionalities:

1. Draw an amount of power $P_{basic}$ from the power-receiving port(s) (in this case, hybrid data/power port 132A) that is sufficient to power the controller 124 and execute certain basic functionalities.
2. Participate in a low-level control protocol by exchanging control messages that enable node 115G to (i) provide the central controller 140 with node-specific information such as type of node, identifier/address, connectivity to other nodes, power and bandwidth demands, identity and characteristics (including power and bandwidth demands) of subtending devices connected to the node, identity and characteristics (including power and bandwidth demands) of internal devices, available DC power (from batteries or other sources), functionalities, etc; and (ii) receive node-specific "power consumption and switching instructions" 310G and a node-specific "routing table" 510G from the central controller 140 and store them in the memory 124B of the node controller 124.
3. Distribute the remaining power (if any) at the power-receiving port(s) (in this case, hybrid data/power port 132A) between the power-transmitting port(s) (in this case, hybrid data/power port 132B) and the internal devices (in this case, internal device 126) in accordance with the power consumption and switching instructions that are specific to node 115G.
4. Join and participate in the logical network with nodes 115A-115F and 115H by, e.g., decoding data packets 175 carried by the data signals received on each of the hybrid data/power ports 132A, 132B and applying the routing table that is specific to node 115G, based upon which the data packet 175 is either released via one of the hybrid data/power ports 132A, 132B or is sent to a higher-layer application for consumption.

An example of the low-level control protocol is the Link Layer Discovery Protocol (LLDP), which is vendor-neutral, or any proprietary discovery protocol or protocol based on one of the foregoing. LLDP is defined by IEEE 802.1AB and formally referred to as "Station and Media Access Control Connectivity Discovery".

It should be appreciated that once node 115G has joined the logical network, further power consumption and switching instructions and routing tables for node 115G can be sent by the central controller 140 in data packets exchanged over the logical network; in that case, the aforementioned low-level control protocol is no longer required.

Node 115A

Figure 3B:
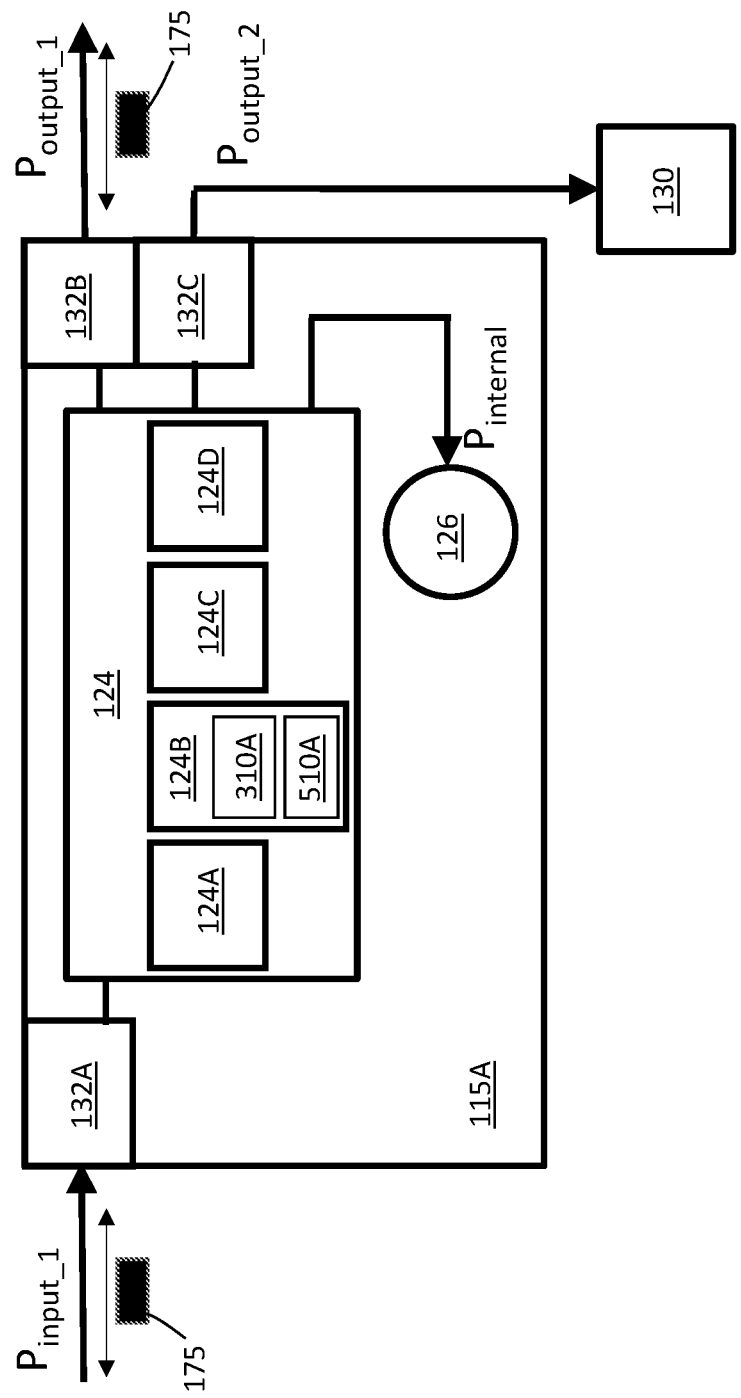

With reference now to FIG. 3B, node 115A includes three hybrid data/power ports 132A, 132B, 132C. Hybrid data/power port 132A is a power-receiving port, since it receives an amount of power $P_{input\_1}$ from the central controller 140, whereas hybrid data/power ports 132B and 132C are power-transmitting ports. In the case of hybrid data/power port 132B, it outputs an amount of power $P_{output\_1}$ to node 115B and in the case of hybrid data/power port 132C, it outputs an amount of power $P_{output\_2}$ to subtending device 130. Node 115A is an example of an "intermediate node", since its hybrid data/power ports 132A, 132B, 132C include one or more hybrid data/power ports actively used in a power-receiving mode (in this case, port 132A) and one or more hybrid data/power ports actively used in a power-transmitting mode (in this case, ports 132B and 132C). Node 115A also comprises an internal device 126.

In addition, node 115A comprises a node controller 124 that is connected to the hybrid data/power ports 132A, 132B, 132C and to the internal device 126 (which would require an amount of power $P_{internal}$ to operate). The node controller 124 may comprise a processor 124A, a memory 124B, power switching circuitry 124C and modulation/demodulation circuitry 124D. The memory 124B stores instructions for execution by the processor 124A. The memory 124B may also store a unique address for node 115A to allow proper addressing by the central controller 140.

The processor 124A of node 115A is configured to interact with the memory 124B, the power switching circuitry 124C and the modulation/demodulation circuitry 124D so as to carry out the following functionalities:

1. Draw an amount of power $P_{basic}$ from the power-receiving port(s) (in this case, hybrid data/power port 132A) that is sufficient to power the controller 124 and execute certain basic functionalities.
2. Participate in a low-level control protocol by exchanging control messages that enable node 115A to (i) provide the central controller 140 with node-specific information such as type of node, identifier/address, connectivity to other nodes, power and bandwidth demands, identity and characteristics (including power and bandwidth demands) of subtending devices connected to the node, identity and characteristics (including power and bandwidth demands) of internal devices, available DC power (from batteries or other sources), functionalities, etc; and (ii) receive node-specific power consumption and switching instructions 310A and a node-specific routing table 510A from the central controller 140 and store them in the memory 124B of the node controller 124.
3. Distribute the remaining power (if any) at the power-receiving port(s) (in this case, hybrid data/power port 132A) between the power-transmitting port(s) (in this case, hybrid data/power ports 132B, 132C) and the internal devices (in this case, internal device 126) in accordance with the power consumption and switching instructions that are specific to node 115A.

4. Join and participate in the logical network with nodes 115B-115H by, e.g., decoding data packets 175 carried by the data signals received on each of the hybrid data/power ports 132A, 132B, 132C and applying the routing table that is specific to node 115A, based upon which the data packet 175 is either released via one of the hybrid data/power ports 132A, 132B, 132C or is sent to a higher-layer application for consumption.

It also be appreciated that once node 115A has joined the logical network, further power consumption and switching instructions and routing tables for node 115A can be sent by the central controller 140 in data packets exchanged over the logical network; in that case, the aforementioned low-level control protocol is no longer required.

Node 115B

Figure 3C:
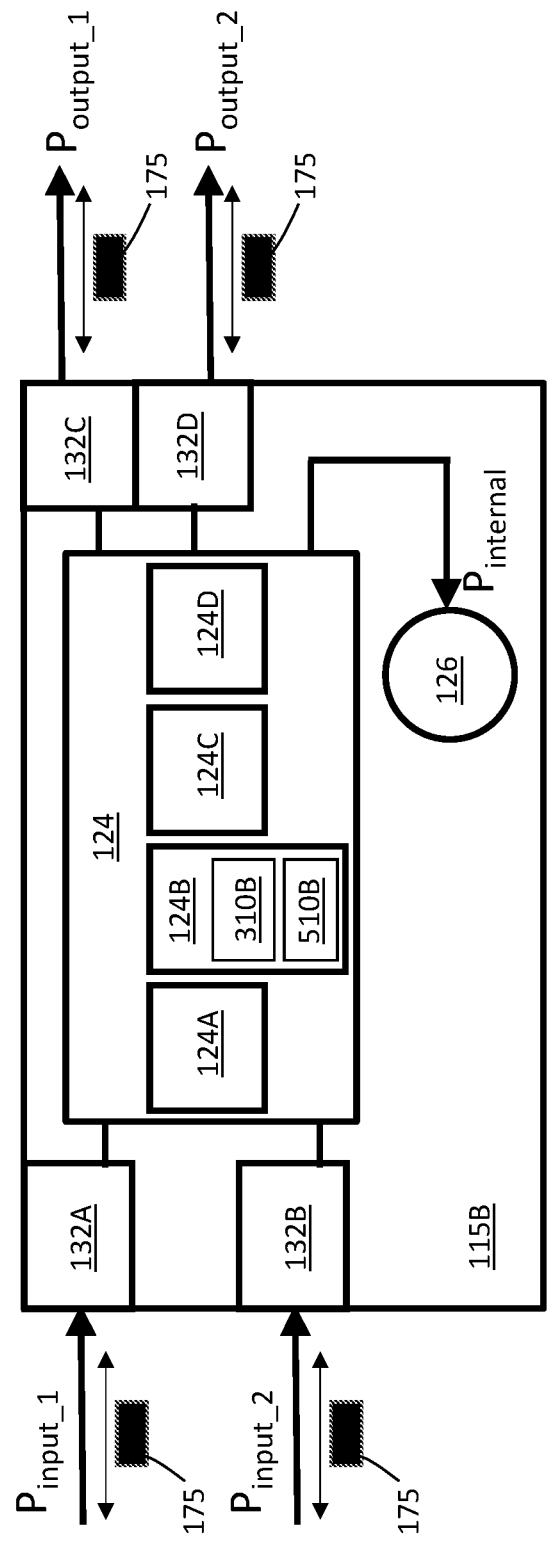

With reference now to FIG. 3C, node 115B includes four hybrid data/power ports 132A, 132B, 132C, 132D. Hybrid data/power ports 132A and 132B are power-receiving ports, with hybrid data/power port 132A receiving and amount of power $P_{input\_1}$ from node 115A and hybrid data/power port 132B receiving an amount of power $P_{input\_2}$ from node 115H. Hybrid data/power ports 132C and 132D are power-transmitting ports, with hybrid data/power port 132C outputting an amount of power $P_{output\_1}$ to node 115E and hybrid data/power port 132D outputting an amount of power $P_{output\_1}$ to node 115C. Node 115B is an example of an "intermediate node", since its hybrid data/power ports 132A, 132B, 132C, 132D include one or more hybrid data/power ports actively used in a power-receiving mode (in this case, ports 132A and 132B) and one or more hybrid data/power ports actively used in a power-transmitting mode (in this case, ports 132C and 132D).

In addition, node 115B comprises a node controller 124 that is connected to the hybrid data/power ports 132A, 132B, 132C, 132D. The node controller 124 may comprise a processor 124A, a memory 124B, power switching circuitry 124C and modulation/demodulation circuitry 124D. The memory 124B stores instructions for execution by the processor 124A. The memory 124B may also store a unique address for node 115B to allow proper addressing by the central controller 140.

The processor 124A of node 115B is configured to interact with the memory 124B, the power switching circuitry 124C and the modulation/demodulation circuitry 124D so as to carry out the following functionalities:

1. Draw an amount of power $P_{basic}$ from the power-receiving port(s) (in this case, hybrid data/power ports 132A, 132B) that is sufficient to power the controller 124 and execute certain basic functionalities.
2. Participate in a low-level control protocol by exchanging control messages that enable node 115B to (i) provide the central controller 140 with node-specific information such as type of node, identifier/address, connectivity to other nodes, power and bandwidth demands, identity and characteristics (including power and bandwidth demands) of subtending devices connected to the node, identity and characteristics (including power and bandwidth demands) of internal devices, available DC power (from batteries or other sources), functionalities, etc; and (ii) receive node-specific power consumption and switching instructions 310B and a node-specific routing table 510B from the central controller 140 and store them in the memory 124B of the node controller 124.
3. Distribute the remaining power (if any) at the power-receiving port(s) (in this case, hybrid data/power ports 132A, 132B) between the power-transmitting port(s) (in this case, hybrid data/power ports 132C, 132D) in accordance with the power consumption and switching instructions that are specific to node 115B.
4. Join and participate in the logical network with nodes 115A and 115C-115H by, e.g., decoding data packets 175 carried by the data signals received on each of the hybrid data/power ports 132A, 132B, 132C, 132D and applying the routing table that is specific to node 115B, based upon which the data packet 175 is either released via one of the hybrid data/power ports 132A, 132B, 132C, 132D or is sent to a higher-layer application for consumption.

It should be appreciated that once node 115B has joined the logical network, further power consumption and switching instructions and routing tables for node 115B can be sent by the central controller 140 in data packets exchanged over the logical network; in that case, the aforementioned low-level control protocol is no longer required.

The amount of power drawn by a given node should be at least sufficient to power the node's node controller 124 (as denoted by $P_{basic}$ above) and may also be sufficient to power (if there are any) the node's internal devices 126 (this amount of power is denoted as $P_{internal}$) and (if there are any) the node's subtending devices 130 (this amount of power is denoted $P_{local}$). These amounts of node-specific power consumption together ($P_{basic}+P_{internal}+P_{local}$) can be denoted $P_{node}$, noting that in cases where there is no internal device and no subtending device to power, $P_{internal}$ and $P_{local}$ may both be equal to 0, in which case $P_{node}=P_{basic}$. The aforementioned quantities may be known to each node and stored in its memory 124B.

Central Controller 140

The central controller 140 is now described in greater detail. The central controller 140 comprises a memory 144, a processor 146, and an interface 148. In the illustrated embodiment, the central controller 140 is connected to node 115A by a hybrid data/power link 110 but it should be understood that the central controller 140 may be connected to a greater number of nodes; as such, the interface 148 may include more than one hybrid data/power port.

In this embodiment (but optionally), the central controller 140 is a source of power for the nodes 115A-115H (although this need not be the case in all embodiments). As such, in this embodiment, the central controller 140 comprises a DC power source 147. Since the central controller 140 may itself be powered by the conventional AC power grid, the DC power source 147 may be implemented by an AC-to-DC converter.

Also in this embodiment (but optionally), the central controller 140 is part of the logical network (established between nodes 115A-115H) and therefore participates in the exchange of data packets with the various nodes 115A-115H by means of its connection to node 115A along the hybrid data/power link 110. FIG. 1B shows the logical network including nodes 115A-115H and the central controller 140.

Accordingly, in this embodiment, data packets sent by the central controller 140 carry a destination address that may be the address node 115A but may be the address of a node other than node 115A. Node 115A and the other nodes in the logical network handle the routing of such packets according to the node-specific routing table stored in each node's memory 124B. Similarly, in this embodiment, the central controller 140 is configured to receive data packets from node 115A along the hybrid data/power link 110, even though these data packets may have been generated by other nodes in the logical network and routed via node 115A (which happens to be the node that is directly connected to the central controller 140).

In some embodiments, the central controller 140 may be implemented as a router or a switch connected to a user device 1000 (such as a console or a mobile wireless device) that implements a graphical user interface (GUI). In some cases, the central controller 140 itself may carry out the functions of the user device 1000.

Initially, the central controller 140 is configured to carry out the following main functionalities:

1. Participate in the aforesaid low-level control protocol with the various nodes 115A-115H by exchanging control messages that enable the collection of information about the various nodes 115A-115H.
2. Based on the collected information, determine the power consumption and switching instructions specific to the various nodes 115A-115H.
3. Based on the collected information, determine the routing tables specific to the various nodes 115A-115H.
4. Participate in the aforesaid low-level control protocol with the various nodes 115A-115H so as to transmit the node-specific power consumption and switching instructions and the node-specific routing tables to the various nodes 115A-115H.

These functionalities of the central controller 140 will now be described in greater detail.

1. Collection of Information about the Nodes

The central controller 140 may collect the node-specific information by participation in the aforesaid low-level control protocol with the various nodes 115A-115H. This can involve the transmission of control messages. Non-limiting examples of node-specific information that may be collected and used by the central controller 140 include, for each node: type of node, identifier/address, connectivity to other nodes, power and bandwidth demands of the node controller 124 (e.g., $P_{basic}$), identity and characteristics of internal devices (including power demands ($P_{internal}$) and bandwidth demands of such internal devices), identity and characteristics of subtending devices connected to the node (including power demands ($P_{local}$) and bandwidth demands of such subtending devices), available DC power (from batteries or other sources) and functionalities.

Alternatively or in addition, the central controller 140 may collect some or all of the node-specific information by being attentive to user entries made via the user device 1000.

2. Determination of the Power Consumption and Switching Instructions Specific to the Nodes The central controller 140 calculates and stores in the memory 144 a "power distribution map" 305 for the nodes 115A-115H. The power distribution map 305 is a representation of a computed (or desired) power usage behavior of each of the nodes 115A-115H. For example, the power distribution map may specify the amount of power received by each power-receiving port of each node, the amount of power consumed by each node and the amount of power transmitted by each power-transmitting port of each node.

To determine the power distribution map 305, the central controller 140 is configured to execute a "power consumption determination algorithm" that may take into account multiple factors. For example, the power distribution map 305 may be based on (i) The node-specific information that was collected from the various nodes 115-115H (see the previous section) or entered by a user via the user device 1000. Non-limiting examples of such information include type of node, identifier/address, connectivity to other nodes, power and bandwidth demands of the controller (including $P_{basic}$ for each node), identity and characteristics of subtending devices connected to the node, identity and characteristics of the node's internal devices, available DC power generated by a battery, and functionalities.

(ii) The interconnection topology computed from the node-specific information or entered by a user via the user device 1000. Information encoding the interconnection topology and other information can be stored as data structures in the memory 144 of the central controller 140.

(iii) Priority information regarding the various nodes 115A-115H (this could also be considered node-specific information). Priority information for each node can be defined, for example, by the central controller 140 giving each node a priority ranking (e.g., high, medium, low), which can be entered by a user via the user device 1000 or computed based on information collected from the nodes such as node type or criticality. The influence of priority on the way in which the power consumption determination algorithm determines the power distribution map 305 is now described by way of non-limiting example. Consider two intermediate nodes that have a subtending device 130 (with a power requirement of $P_{local}$), except that one is a higher-priority node and the other is a lower-priority node. The power requirements of each node can therefore be expressed $P_{node}=P_{basic}+P_{internal}+P_{local}$. For the higher-priority node, this particular node may be instructed to consume an amount of received DC power equal to $P_{node}$, which is sufficient to meet the power requirements of its node controller 124 and its internal device 126 (if any) and its subtending device 130 (if any). However, for the lower-priority node, this particular node may be instructed to consume an amount of received DC power equal to $P_{basic}$, which is only enough to power its controller, thereby allowing the lower-priority node to participate in power routing and data routing, but not allowing the lower-priority node to power its subtending device. This example is simply by way of illustration, to show that in executing the power consumption determination algorithm, the central controller 140 is able to instruct nodes to consume power differently, depending on a variety of factors, including priority.

(iv) Other factors considered by the central controller 140 in determining the power distribution map 305. One example of such other factor may include the amount of power available to be supplied by the central controller 140 and the power source 150. Another example of such other factor may include the specification of the hybrid data/power links 110 themselves. This may include the maximum power level that can be transmitted along any of the hybrid data/power links 110 (the "maximum link power"). This maximum link power may vary depending on the PoE standard that is used, for example.

The amount of power to be drawn by each of the various nodes 115A-115H may thus be determined by the central controller 140 based on factors such as $P_{basic}$, $P_{internal}$ and $P_{local}$ for each node; the interconnection topology (namely, the location of each node relative to the location of other nodes and the manner in which they are interconnected); and other factors (e.g., such as priority).

To control the power usage behavior of each of the nodes 115A-115H so that it is in accordance with the power distribution map 305, the central controller 140 is configured to generate "power consumption and switching instructions" 310A-310H specific to each node.

In the case of a source node having two or more power-transmitting ports, these instructions indicate how the power that it generates is switched among its two or more power-transmitting ports. In the case of an intermediate node, these instructions indicate how the power that it receives via its one or more power-receiving ports is to be consumed by the intermediate node and switched to its one or more power-transmitting ports. In the case of a terminal node having two or more power-receiving ports, these instructions indicate how the power that it receives along its two or more power-receiving ports is consumed by the node.

In an embodiment, power consumption and switching instructions 310X for node 115X indicate, if node 115X has one or more power-receiving ports, how much received DC power node 115X is to draw from each of its one or more power-receiving ports. If one or more of the hybrid data/power ports of node 115X are power-transmitting ports, then power consumption and switching instructions 310X also indicate how much received DC power node 115X is to send via each of its one or more power-transmitting ports. The specified amounts of power, whether drawn or sent, may be indicated by power consumption and switching instructions 310X in absolute terms (e.g., watts) or proportional terms (% associated per port), for example. Where there is only one hybrid data/power port of a given kind (a power-receiving port or a power-transmitting port), certain information can be omitted from power consumption and switching instructions 310X, as the required power usage behavior would be clear to node 115X even in the absence of a complete set of power consumption and switching instructions.

Example power consumption and switching instructions 310A for node 115A may be designed such that upon being interpreted by the node controller 124, the node controller 124 causes the power $P_{output\_1}$ received by node 115A from hybrid data/power port 132A to be transferred to hybrid data/power port 132B, minus the power $P_{basic}$ used by the node controller 124 of node 115A, the power $P_{internal}$ used by subtending device 126 and the amount of power ($P_{output\_2}=P_{local}$) supplied the subtending device 130 via hybrid data/power port 132C. This works out to $P_{output\_1}=P_{input}-P_{basic}-P_{internal}-P_{local}$.

Example power consumption and switching instructions 310B for node 115B may be designed such that upon being interpreted by the node controller 124, the node controller 124 causes the power $P_{input\_1}$ at hybrid data/power port 132A to transfer through to hybrid data/power port 132C and the power $P_{input\_2}$ received at hybrid data/power port 132B to transfer through to hybrid data/power port 132D, while evenly distributing the power $P_{basic}+P_{internal}$ required for internal functionalities. As result, each of the power output streams (from hybrid data/power port 132A to hybrid data/power port 132C, and from hybrid data/power port 132B to hybrid data/power port 132D) is reduced by half of the power use of node 115B, or $P_{output\_1}=P_{input\_1}-\frac{1}{2}(P_{basic}+P_{internal})$ and $P_{output\_2}=P_{input\_2}-\frac{1}{2}(P_{basic}+P_{internal})$.

The power distribution map 305 may need to be updated periodically. The power consumption determination algorithm can therefore include periodic updates, where the central controller 140 detects a change affecting power requirements for at least one of the nodes and determines a new power distribution map based on the change. The power consumption determination algorithm effectively re-runs, returning to steps of receiving new information such as new node-specific information. A new power distribution map 305 is determined, causing new power consumption and switching instructions 310A-310H to be communicated to the nodes 115A-115H via the hybrid/power links 110.

3. Determination of the Routing Tables Specific to the Nodes

It should be appreciated that before, after, or during the execution of the aforementioned power consumption determination algorithm, the central controller 140 also carries out a data routing algorithm to establish and maintain a logical network among the nodes 115A-115H. Specifically, the central controller 140 is configured to determine a data routing map 505, which is a representation of a computed (or desired) routing behavior of each of the nodes 115A-115H.

The data routing algorithm may take into account multiple factors, including:

(i) The node-specific information that was collected from the various nodes 115-115H (see the previous section) or entered by a user via the user device 1000. Non-limiting examples of such information include type of node, identifier/address, connectivity to other nodes, power and bandwidth demands (including average and peak data speed requirements each node), identity and characteristics of subtending devices connected to the node, identity and characteristics of the node's internal devices, and functionalities.

(ii) The interconnection topology computed from the node-specific information or entered by a user via the user device 1000. Information encoding the interconnection topology and other information can be stored as data structures in the memory 144 of the central controller 140.

(iii) Priority information regarding the various nodes 115A-115H. Priority information for each node can be defined, for example, by the central controller 140 giving each node a priority ranking, which can be entered by a user via the user device 1000 or computed based on information collected from the nodes such as node type or criticality. The influence of priority on the way in which the data routing algorithm determines the data routing map 505 is now described by way of non-limiting example. Consider two intermediate nodes with a subtending device that is a video camera, except that one is a higher-priority node (e.g., the video camera is at the main entrance) and the other is a lower-priority node (e.g., the video camera is inside the stock room). In this case, if the bandwidth of the hybrid data/power links is saturated, the data packets sent to the central controller 140 from the high-priority node may continue to be routed, whereas the data packets sent from the lower-priority node may be cached until more bandwidth becomes available, or dropped. The priority information associated with a particular destination address may be incorporated into the routing tables themselves. This example is simply by way of illustration, to show that in executing the data routing algorithm, the central controller 140 is able to instruct nodes to route data differently, depending on a variety of factors, including priority.

(iv) Other factors considered by the central controller 140 in determining the data routing map 505. One example of such other factor may include the specification of the hybrid data/power links 110 themselves. This may include the available bandwidth on the hybrid data/power links 110. This available bandwidth may vary depending on the PoE standard that is used, for example.

The data routing map 505 may be implemented by routing tables 515A-515H applied by the node controllers 124 of the various nodes 115A-115H, respectively. A given one of the routing tables 510X includes routing information (instructions) related to consumption and/or forwarding of data packets received by node 115X. Although in this embodiment, the routing information is encoded in the form of routing tables, this information can take the form of any suitable data structure.

It will be recalled that each of the nodes 115A-115H has an address and each data packet includes a destination address. The addresses can be IP addresses, MAC addresses or any other identifier that is unique to each node in the logical network. A data packet arriving at a particular node (e.g., node 115X) is considered to be destined for node 115X if its destination address is the address of node 115X; the data packet is considered to be destined for a different node if its destination address is not the address of node 115X.

Routing table 510X (for node 115X) is indicative of how to process a received data packet whose destination address does not match the address of the node 115X, by directing the data packet through node 115X to a desired hybrid data/power port that can carry data out of node 115X to a neighboring node. In particular, routing table 510X indicates towards which hybrid data/power port to send incoming data packets that are not destined for node 115X, based on the destination address of such data packets.

FIG. 5 shows two example routing tables, namely routing table 510A for node 115A and routing table 510B for node 115B, applicable to the logical network of FIG. 1B. It is recalled that node 115A has hybrid data/power port 132A connected to the central controller 140 and hybrid data/power port 132B connected to node 115B. Also, node 115B has hybrid data/power port 132A connected to node 115A, hybrid data/power port 132B connected to node 115H, hybrid data/power port 132C connected to node 115E and hybrid data/power respective port 132D connected to node 115C.

Routing tables 510A and 510B are different, in accordance with the different number of hybrid data/power ports available at each node and the nodes in data communication with each node. Specifically, routing table 510A specifies that a received data packet with a destination address of any node other than node 115A is forwarded via hybrid data/power port 132B. For its part, routing table 510B specifies that a received data packet with a destination address of node 115A is forwarded via hybrid data/power port 132A, a received data packet with a destination address of node 115G or node 115H is forwarded via hybrid data/power port 132B, a received data packet with a destination address of node 115D, node 115E or node 115F is forwarded via hybrid data/power port 132C and a received data packet with a destination address of node 115C is forwarded via hybrid data/power port 132D.

Also shown is a priority level assigned to each destination node. As such, in the event of local data congestion, packets destined for high-priority destinations (e.g., nodes 115B, 115D and 115G in routing table 510A and nodes 115E, 115F and 115H in routing table 510B) are routed while packets destined for medium- or low-priority destinations may be cached for later storage, or dropped.

Those skilled in the art will appreciate that the above is a simplistic view of how to construct a routing table, and that various traffic engineering algorithms can be applied to produce routing tables that provide shorter travel times, avoid endless loops and meet other cost and performance criteria.

The data routing map 505 may need to be updated periodically. The data routing algorithm can therefore include periodic updates, where the central controller 140 detects a change affecting data routing requirements for at least one of the nodes and determines a new data routing map based on the change. The data routing algorithm effectively re-runs, returning to steps of receiving new information such as new node-specific information. A new data routing map 505 is determined, causing new routing tables 510A-510H to be communicated to the nodes 115A-115H via the hybrid/power links 110.

4. Transmission of the Node-Specific Power Consumption and Switching Instructions and the Node-Specific Routing Table to the Nodes The power consumption and switching instructions 310A-310H and the routing tables 510A-510H can be distributed to the nodes 115A-115H via the interface 148 and the hybrid data/power links 110. This can be done by participating in the aforesaid low-level control protocol with the various nodes 115A-115H. Examples of the low-level control protocol include LLDP or other protocols at any suitable layer(s) of the Open Systems Interconnection (OSI) model (such as physical, data link or transport. The individual nodes 115-115H respond to the received power consumption and switching instructions and activate the received routing tables.)

Once the logical network has been established, future power consumption and switching instructions and future routing tables need not be sent by control messages over the low-level control protocol, but rather can be sent by way of data packets over the logical network, since the controller 140 is part of the logical network together with nodes 115A-115H.

Figure 7:
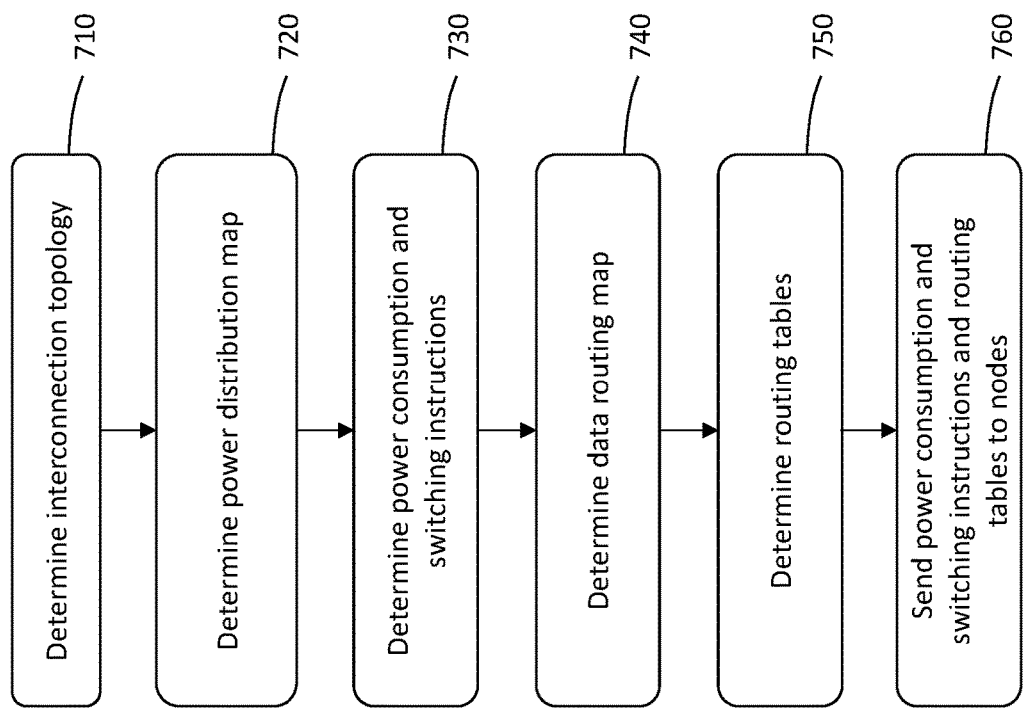
FIG. 7 is a flowchart illustrating steps in an algorithm carried out by the central controller, in accordance with a non-limiting embodiment.

Thus, it can be said that the central controller 140 carries out an algorithm for determining the power distribution map 305 and the data routing map 505. This is summarized with additional reference to FIG. 7. Specifically, at step 710, the central controller 140 determines the interconnection topology, e.g., each node's type and capabilities and which nodes are connected to which other nodes. At step 720, the central controller 140 determines the power distribution map 305, namely the representation of the power usage behavior of each of the nodes 115A-115H, based on each node's requirements and the available power from the various power sources (e.g., the central controller 140 and the power source 150). At step 730, the central controller 140 determines the specific power consumption and switching instructions 310A-310H for each of the nodes 115A-115H, based on the power distribution map 305. At step 740, the central controller 140 determines the data routing map. At step 750, the central controller 140 determines the routing tables 510A-510H that implement the data routing map 305. It is noted that steps 740 and 750 may be carried out before, during or after execution of steps 720 and step 730. At step 760, the central controller 140 distributes the power consumption and switching instructions 310A-310H and the routing tables 510A-510H to the various nodes 115A-115H, which causes DC power to be distributed via the hybrid data/power links and the logical network to be established.

Figure 8:
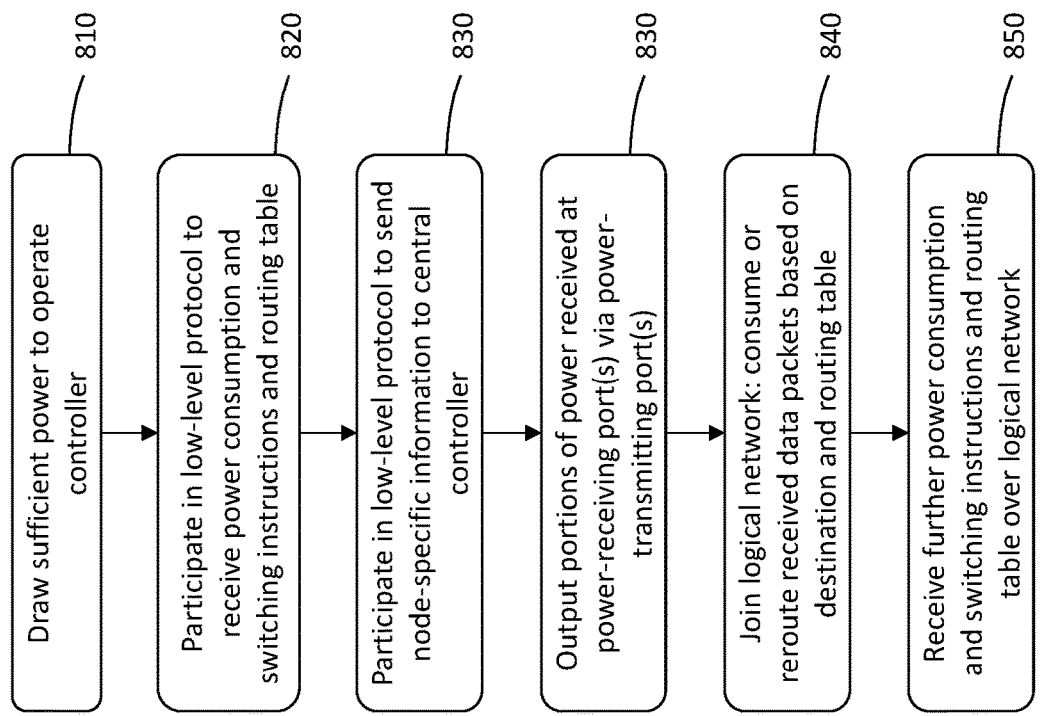
FIG. 8 is a flowchart illustrating steps in an algorithm carried out by a node, in accordance with a non-limiting embodiment.

Also, it will be appreciated that there has been provided a description of a network device that comprises, in some cases, at least three ports connectable to hybrid data/power links for the transport of DC power and data packets (at least one of the ports being a power-receiving port or ports for the network device and the remaining port or ports being power-transmitting port or ports for the network device) and a controller operatively coupled to the at least three ports and comprising power switching circuitry. The controller operates based on power drawn from a portion of the DC power received via the power-receiving port or ports. The controller is configured to executed a method that is summarized with reference to FIG. 8. Specifically, at step 810, the controller draws sufficient power to operate. St step 820, the controller participates in a low-level protocol to receive power consumption and switching instructions and a routing table (e.g., from the central controller 140). At step 830, by participating in the low-level protocol, the controller sends node-specific information to the central controller 140. At step 840, the controller outputs portions of power received at its power-receiving port(s) via its power-transmitting port(s). At step 850, the controller joins a logical network and consumes or reroutes received data packets based on the destination address specified in the received data packet and the previously received routing table. At step 860, the controller receives further power consumption and switching instructions and further routing tables over the logical network that it has joined. The controller may also send updates in node-specific information in data packets by virtue of its adhesion to the logical network.

In some cases, new information may be collected or computed by the central controller 140 in real-time. For example, power requirements and bandwidth requirements may change, resulting in changes to the power distribution map 305 and/or to the routing map 505. For example, changes in power requirements and bandwidth requirements may arise due to, for example, nodes or other devices being added to or removed to the interconnection topology, nodes joining or leaving the logical network, nodes suddenly dumping large amounts of data (e.g., motion-sensitive cameras), nodes or devices ceasing operation, etc.

For example, in some embodiments, the power distribution map 305 may need to adapt as a result of triggering events. For example, a triggering event can be an unexpected change in received or supplied power (a surge or power outage) which, when detected by the central controller 140, causes the central controller 140 to recompute the power distribution map 305 and the power switching and consumption instructions 310A-310H for the various nodes 115A-115H.

For example, consider that the central controller 140 becomes unable to supply power, and that all power must come from power source 150. The absence of power supplied to node 115A or the inability to supply power to node 115A can be detected by node 115A or by the central controller 140 itself. This changes the power distribution map 305; for example, it may result in the decision to cease supplying lower-priority nodes with power. After a new power distribution map 305 is recalculated, a set of revised power consumption and switching instructions has to be computed for the nodes 115A-115H. These revised power consumption and switching instructions change the power usage behavior of the nodes, in particular node 115A and the nodes that previously received power from node 115A.

For example, assume that prior to the triggering event, nodes 115B, 115D, 115E and 115F were drawing power from the power supplied node 115A. This now becomes no longer an option. Instead, all power comes from power source 150, and the power usage behavior of the various nodes needs to change in order to allow nodes 115B, 115D, 115E and 115F to draw power supplied from the power source 150. If power source 150 does not supply sufficient power to meet the needs of the various nodes, prioritization may be carried out.

Thus, power is automatically redirected to a different group of nodes in the event that the central controller 140 can no longer supply the requisite power. By way of example, the central controller 140 may transmit power from a typical DC source, whereas the second DC power source 150 may be a generator or battery. Assume also that node 115E draws power from node 115A and that the subtending device 130 connected to node 115E is a light. If a power outage occurs (i.e., power controller 140 is unable to supply power to node 115A and therefore), revised power consumption and switching instructions 310B of node 115B cause available emergency power (from power source 150 via nodes 115G and 115H) to be drawn from node 310H and sent to node 310E so that the light can be powered. However, this may have an impact on the ability of other nodes to power their internal devices 126 or subtending devices 130. As such, further revised power consumption and switching instructions may need to be issued to the various other nodes as well.

In the above scenario, it is assumed that the central controller 140 has the ability to communicate revised power consumption and switching instructions to the various nodes despite not being able to provide sufficient power to node 115A in order to meet its needs. This is not a contradiction, as the aforementioned low-level control protocol may still be available for communication of the power consumption and switching instructions via control messages at low power and low bandwidth. However, in other embodiments, it is not necessary to rely on continued operation of the central controller 140; rather a distributed response to triggering events may be implements. For example, the node controller 124 of node 115A (or of any other nodes) may be programmed to monitor the amount of power on its power-receiving hybrid data/power ports and to autonomously implement revised power consumption and switching instructions (which could have been previously stored in the node memory 120) upon detection of a change in supplied power. In this case, changes to the power consumption and switching instructions can occur locally, in the absence of control from a central controller 140.

In some embodiments, upon failure of the central controller 140, another node may take over execution of the power consumption determination algorithm and data routing algorithm formerly held by the central controller 140.

Virtual Circuits

It is worth noting that the power consumption and switching instructions 310A-310H can be used to form "virtual circuits" within the same the interconnection topology. A virtual circuit is a collection of nodes that all receive power from the same node (a "virtual breaker" node) as a result of programmable power usage behavior exhibited by that node (more precisely, by that node's internal node controller 124 executing its power consumption and switching instructions). The power distribution map 305 can define one or more such virtual circuits, each with its virtual breaker node that is powered independently from the others. Practically speaking, the definition of a virtual circuit takes the form of a constraint on the power distribution map 305, forcing power to either flow through or avoid certain nodes. The resulting power consumption and switching instructions 310A-310H generated by the central controller 140 under these virtual circuit constraints (which may be user-specified) cause the subset of nodes in each virtual circuit to be linked to one another from a power supply point of view as if they are part of an independent physical circuit. The composition of these virtual circuits can be modified from the central controller 140 by changing the underlying virtual circuit constraints, albeit without modifying any of the hardware within the network.

In particular, the definitions of the virtual circuits can be modified at any desired time, e.g., by a user of the user device 1000. In particular, the user can enter data into the user device 1000 to define the virtual circuits in a graphical manner. This information is then translated by the user device 1000 or the central controller 140 into constraints on the power distribution map 305, ultimately resulting in new power consumption and switching instructions 310A-310H for the various nodes 115A-115H. The central controller 140 can provide each of the nodes 115A-115H with additional information specifying the virtual circuit of which the node is a part.

An example is now described with reference to FIG. 4A, where a first virtual circuit 410 and a second virtual circuit 420 are illustrated. The first virtual circuit 410 (thick solid lines) includes nodes 115A, 115B, 115E and 115F, which are all programmed to receive DC power from the central controller 140 (which acts as a DC power source), with node 115A acting as a virtual breaker node for virtual circuit 410. The second virtual circuit 420 (dashed lines) includes nodes 115G, 115H, 1151B, 115C and 115D, which are all programmed to receive power from the second DC power source 150, with node 115G acting as virtual breaker node. It should be understood that in other embodiments, different power sources are not required to power different virtual circuits; rather, the same power source can be used to power two or more virtual circuits.

It is noted that in this example, node 115B is part of both the first virtual circuit 410 and the second virtual circuit 420. Accordingly, power consumption and switching instructions 310B executed by the node controller 124 of node 115B direct node 115B to treat the DC power flowing through each of the virtual circuits 410, 420 independently from each other. For example, the power received from node 115A is passed directly to node 115E on the first virtual circuit 410 (minus half the contribution for the node's own power requirements) while the power received from node 115H is passed directly to node 115C on the second virtual circuit 420 (minus the other half of the node's own power requirements). Accordingly, although all the nodes 115A-115H are part of the same interconnection topology, power can be transmitted to different nodes along different virtual circuits 410, 420. No power is exchanged between nodes 115D and 115E, as they are in separate virtual circuits. However, the hybrid data/power link 110 between nodes 115D and 115E remains physically connected to allow the transport of further power consumption and switching instructions, routing tables or data packets, for example.

In this configuration, operation of nodes 115E and 115F is entirely dependent on the ability of node 115A to supply enough power to them (via node 1151B), and operation of nodes 115C and 115D is entirely dependent on the ability of node 115G to supply enough power to them (via nodes 1105H and 115B). It is recalled that node 115A is sources by the central controller 140 and that node 115G is sourced by the power source 150, which therefore feeds into the computation of the overall power distribution map as a set of constraints.

A noteworthy feature of virtual circuits is that they can be reorganized dynamically, so as to create different virtual circuits at different times. For example, FIG. 4B shows the same interconnection topology as in FIG. 4A, except with different virtual circuits being implemented.

Figure 4A:
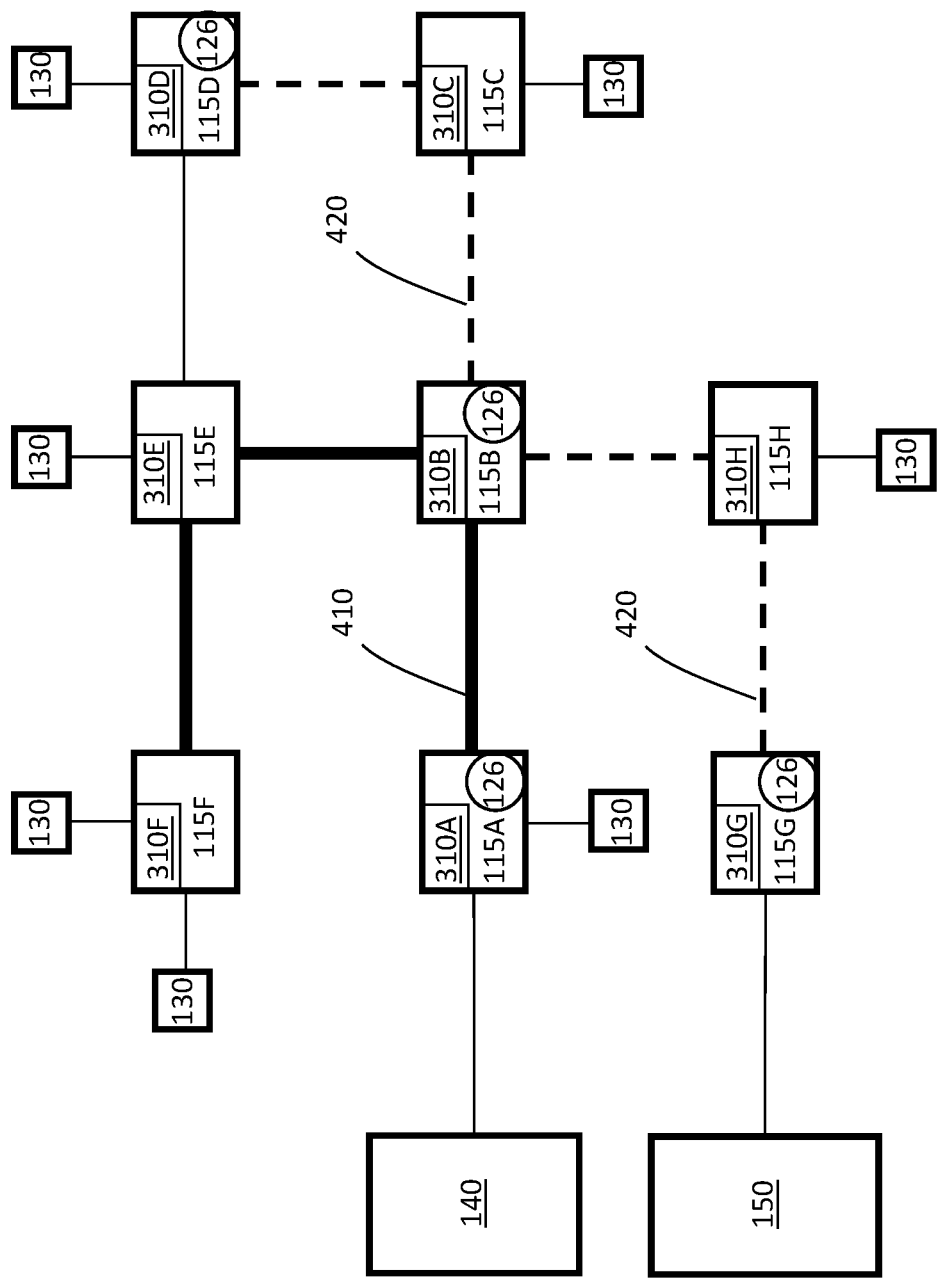
FIGS. 4A and 4B are block diagrams illustrating how the nodes of FIG. 1A can be arranged into virtual circuits, in accordance with a non-limiting embodiment.

Specifically, in this case, a third virtual circuit 430 includes nodes 115A, 1151B, 115E and 115F, as well as nodes 115C, 115D that were previously part of the second virtual circuit 420 of FIG. 4A. The hybrid data/power link 110 between nodes 115D and 115E can for part of this third virtual circuit 430. All the nodes on the third virtual circuit 430 can receive power from central controller 140 via node 115A acting as a virtual breaker node.

A fourth virtual circuit 440 includes node 115G and 115H, which are configured to receive power from the second DC power source 150. No power is exchanged between nodes 115B and 115H, as they are in separate virtual circuits.

Figure 4B:
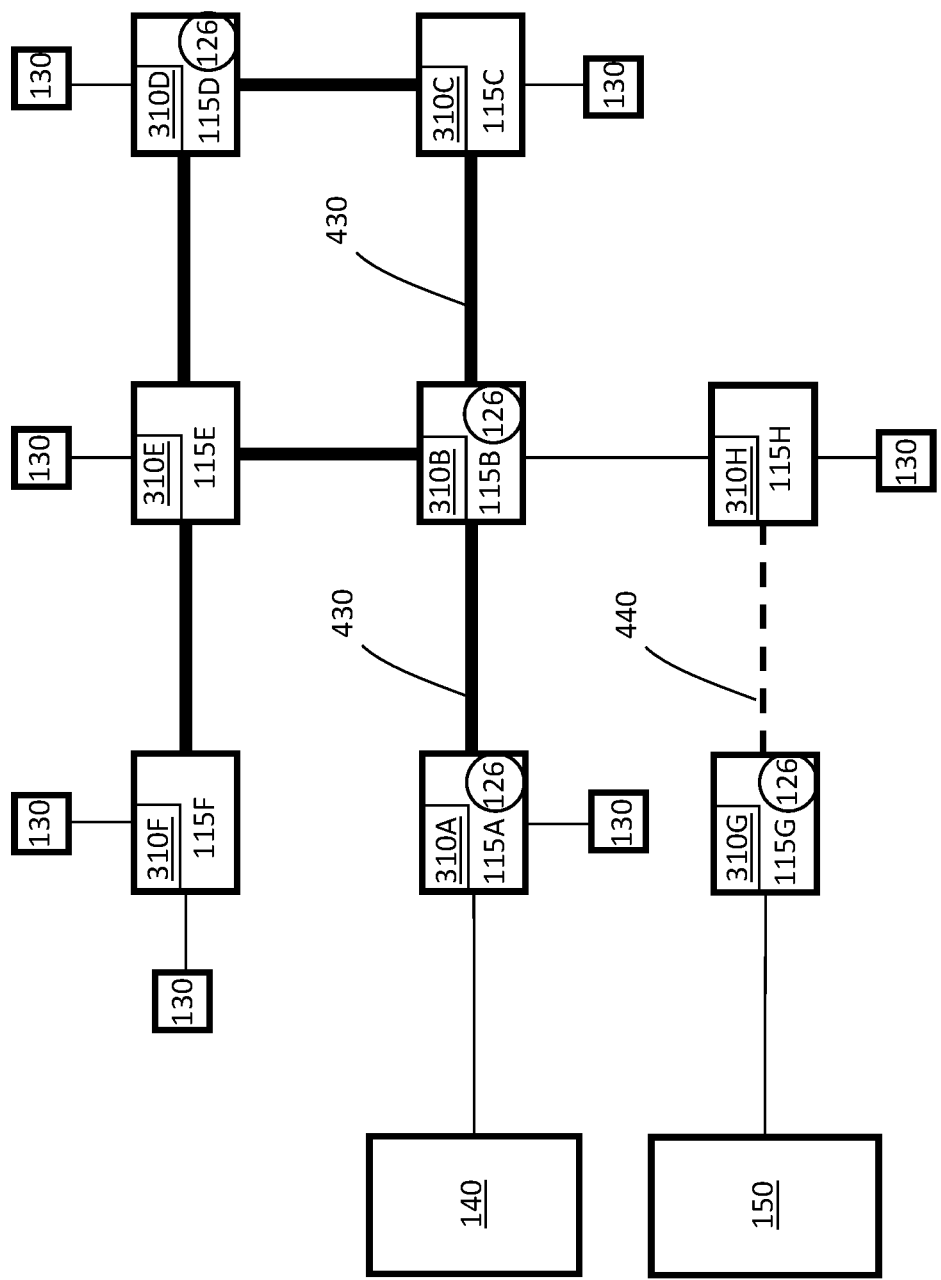

In the virtual circuit configuration of FIG. 4B, virtual breaker nodes 115A and 115G transmit DC power to the third virtual circuit 430 and the fourth virtual circuit 440, respectively, in a completely independent manner, as there is no common node shared by the two virtual circuits 430, 440.

The change from the configuration of FIG. 4A to that of FIG. 4B occurs simply by changing the power distribution map 305, which results in the central controller 140 issuing updated power consumption and switching instructions 310A-310H to at least some if not all of the nodes 115A-115H. Physical connections of the underlying interconnection topology, although not necessarily all used in the new virtual circuit definition remain in place. For example, the hybrid data/power link 110 between nodes 115H and 115B carries no power but remains physically connected to allow the transport of further power consumption and switching instructions, routing tables or data packets, for example.

The power consumption and switching instructions 310A-310H can change overtime, e.g., thereby transforming the virtual circuit configuration of FIG. 4A into the virtual circuit configuration of FIG. 4B, without modifying any of the hardware within the system. The power consumption and switching instructions 310A-310H are specific to each of the nodes 115A-115H that are defined within the power distribution map 305, so that each of the nodes 115A-115H implements distribution of the DC power that flows through that node according to its current instructions.

Also of interest is that when reconfiguring virtual circuits, there need not be any change to the data routing map 505 of the routing tables 510A-510H. While the virtual circuits may isolate groups of nodes from one another in terms of power consumption, data communication among the nodes still occurs. In the configuration of FIG. 4A, data can flow between a node in virtual circuit 410 and a node in virtual circuit 420 (e.g., between nodes 115D and 115E), even though power may not. The same applies to virtual circuits 430 and 440 in the configuration of FIG. 4B (e.g., between nodes 115H and 115B). As a result, data (e.g., large amounts of data such as in the case where the internal devices 126 or subtending devices 130 are cameras), can be passed along the most efficient route, as determined by the routing tables 510A-510H, rather than being restricted to travel exclusively within a virtual circuit. This is a difference with respect to traditional electrical circuits that are completely isolated from one another and do not allow data travel between nodes in different traditional electrical circuits.

Dual-Powered Nodes

Figure 6:
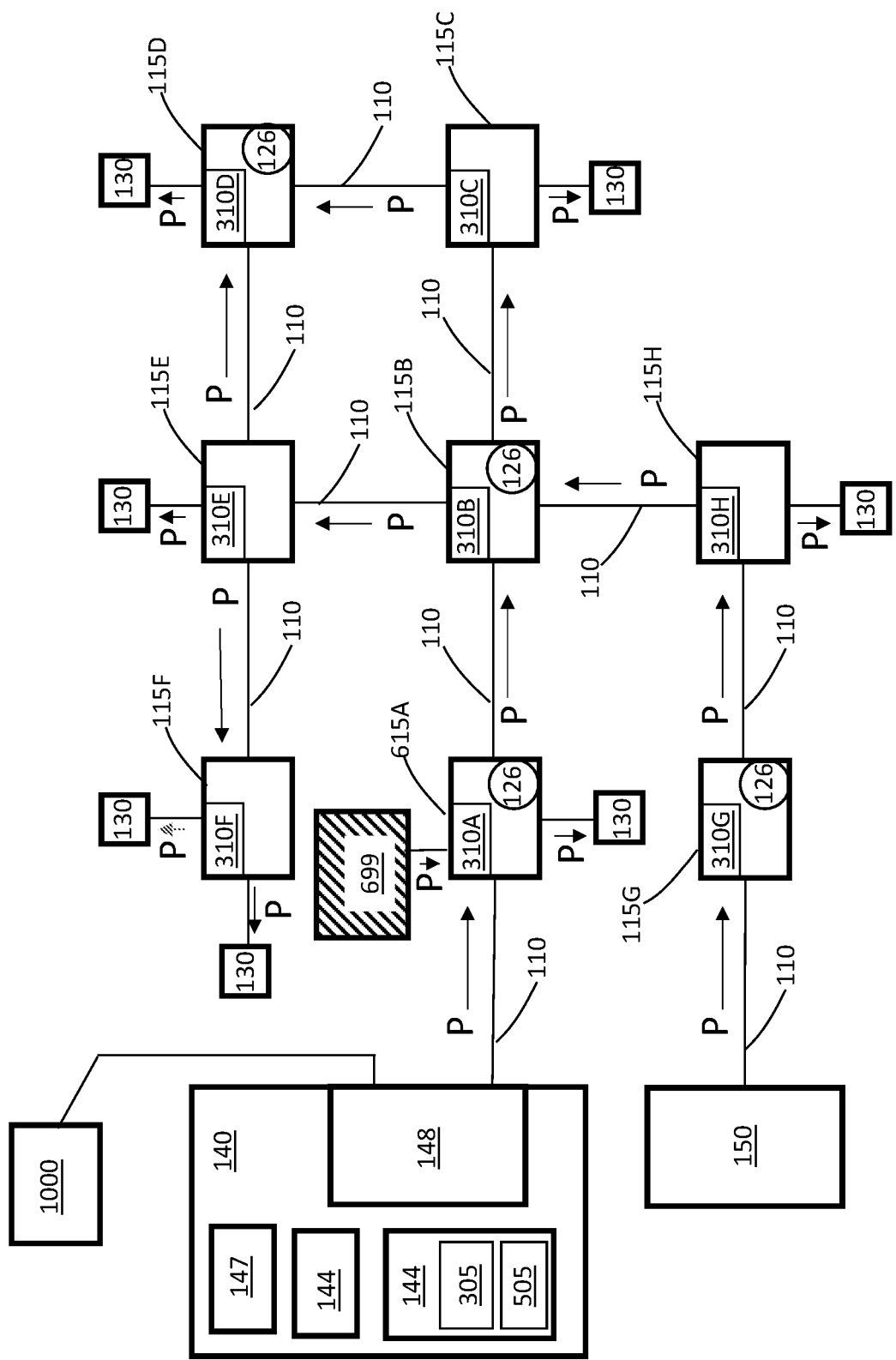
FIG. 6 is a block diagram showing the interconnection topology of FIG. 1A, except where one of the nodes is dual-powered, in accordance with a non-limiting embodiment.

In some embodiments, the node controller 124 of a given node within the interconnection topology may have the option to draw power from one or more power-receiving ports that are hybrid data/power ports, but also from an independent power source (i.e., independent of the interconnection topology) such as an AC source (e.g., wall plug), an uninterruptible power supply or a battery. Such a node may be referred to as a dual-powered node. FIG. 6 illustrates the interconnection topology of FIG. 1A, except where node 615A (formerly 315A) is a dual-powered node. The independent power source for node 615A is denoted 699 and is connected to node 615A via a power port, not necessarily a hybrid data/power port.

Due to its additional ability to draw power from the independent source 699, dual-powered node 615A is capable of carrying out the following functionalities in a non-limiting embodiment:

1. Draw an amount of power $P_{basic}+P_{internal}$ from the independent source 699. It is recalled that $P_{basic}$ is sufficient to power the node controller 124 of node 615A for the execution of certain basic functionalities, and that $P_{internal}$ is the power requirement associated with the internal devices 126 of node 615A.
2. Participate in a low-level control protocol by exchanging control messages that enable node 615A to (i) provide the central controller 140 with node-specific information and (ii) receive node-specific power consumption and switching instructions and a node-specific routing table from the central controller 140. This participation continues regardless of the fact that node 615A does not draw power from any of its power-receiving ports. It is noted that if node 615A has already joined the logical network (see point 4. below), further power consumption and switching instructions and routing tables for node 615A can be sent by the central controller 140 in data packets exchanged over the logical network; in that case, the transmission of control messages using the low-level control protocol is no longer required.
3. Distribute the power received at the power-receiving port 132A between its power-transmitting ports 132B, 132C in accordance with the power consumption and switching instructions 310B that are specific to node 615A. It is noted that this distribution allows the subtending device 130 of node 615A to be powered from power received from the central controller 140.
4. Join and participate in the logical network with the other nodes by, e.g., decoding data packets carried by the data signals received on each of the node's hybrid data/power ports and applying the routing table 510B that is specific to node 615A, based upon which the packet is either released via one of the hybrid data/power ports or is sent to a higher-layer application for consumption by node 615A.

In this way, the dual-powered node 615A participates in implementing the power distribution map 305 without drawing power for its node controller 124 or its internal device 126. In other words, the power consumption of dual-powered node 615A, as seen by the controller 140, is that of node 315B from FIG. 1A minus ($P_{basic}+P_{internal}$). In other words, the power demands of dual-powered node 615A from the central controller 140 are lower than in the case where the independent power source 699 was not available. This is factored into the determination of the power distribution map 305 by the central controller 140, which has an effect on the power consumption and switching instructions sent not only to dual-powered node 615A but also to the other nodes, since the amount of power available to the other nodes is greater.

It should also be considered that the independent power source 699 may also be used to power the subtending device 130 of node 615A.

As such, it has been described how node 615A may participate in the distribution of power (in accordance with the power distribution map 305 determined by the central controller 140) without drawing any power for its own purposes. In addition, node 615A participates in the logical network through the routing of data packets in accordance with routing tables. These data packets arrive on hybrid data/power links together with DC power. It has thus been described how in some embodiments, processing of the received data packets is made possible by drawing $P_{basic}$ from the received DC power (in the case of node 315B), whereas in other embodiments, processing of the received data packets does not require the draft of any of the received DC power, since power is available from an independent power source (in the case of node 615A).

Although the independent power source 699 may be available, this does not imply that it must be used to power the node controller 124. Rather, the independent power source 699 may be used only in certain cases, either as judged by the node controller 124 or the central controller 140. Instructions for using, or not using, the independent power source 699 may be communicated as an extension to the power consumption and switching instructions.

It should also be considered that the independent power source 699 may fail or cease to become available, for example during a power failure. In such a case, if the independent power source 699 was being used to power the controller 124 and the internal device(s) 126 of a dual-powered node, this would cause a failure in the controller 124. However, power may still be available at a power receiving port of the dual-powered node. As such, the controller 124 may draw some of the available power (e.g., an amount $P_{basic}$) in order to carry out a reboot sequence and return to a mode of operation as if there were no more independent power source 699 (i.e., as if the node were not dual-powered). Of course, this additional draft of power (e.g., in the amount of $P_{basic}$) reduces the amount of power that would be available to downstream nodes. These changes are taken into account by the central controller 140, which computes a new power distribution map and a new set of power consumption and switching instructions for the various nodes.

In some embodiments, certain network devices in the interconnection topology may be single- or multi-port "legacy" devices that are connected by hybrid data/power links but do not qualify as nodes equipped with the above described functionalities. Legacy devices do not have a power consumption behavior that is controlled by the above-described power consumption and switching instructions received from the central controller 140 and do not have a packet switching behavior that is controlled by the above-described routing tables received from the central controller 140. A legacy device with a power-receiving port can participate in the aforementioned low-level control protocol in order to request a certain amount of received power over the power-receiving port. If it has a power-transmitting port, a legacy device simply transfers the signal on the power-receiving port over to the power-transmitting port, minus the amount of power it draws for operation of the legacy device. The power needs of the legacy devices in the interconnection topology are known to the central controller 140 and considered in the computation of the power distribution map (and the power consumption and switching instructions sent to the nodes).

Figure 9A:
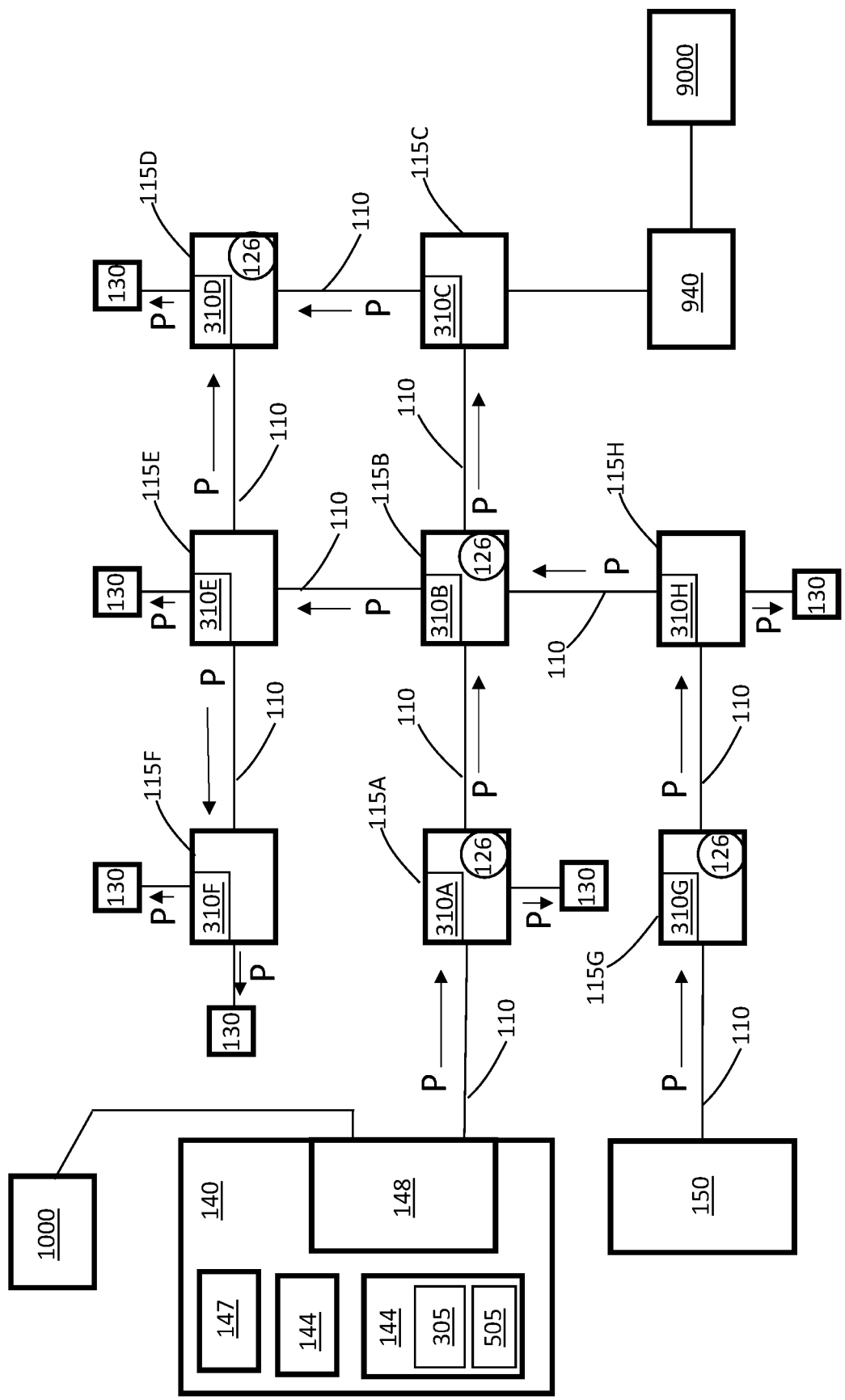
FIGS. 9A and 9B are block diagrams similar to those of FIGS. 1A and 1, respectively, except that a second central controller is part of the interconnection topology and the logical network.

In a variant, plural central controllers may be provided, as shown in FIG. 9A, where there is provided central controller 140 and central controller 940. In this embodiment, central controller 140 acts as a power source but central controller 940 does not. This implies that all nodes 115-A-115H are powered by central controller 140 but this need not be the case. In particular, nodes 115A-115H are responsive to power consumption and switching instructions sent by central controller 140 in order to implement part of a power distribution map computed by central controller 140. Central controller 140 is integrated with/connected to user device 1000 (e.g., over a data network such as the internet) and central controller 940 is integrated with/connected to user device 9000 (e.g., over a data network such as the internet) but could also be connected to user device 1000.

Figure 9B:
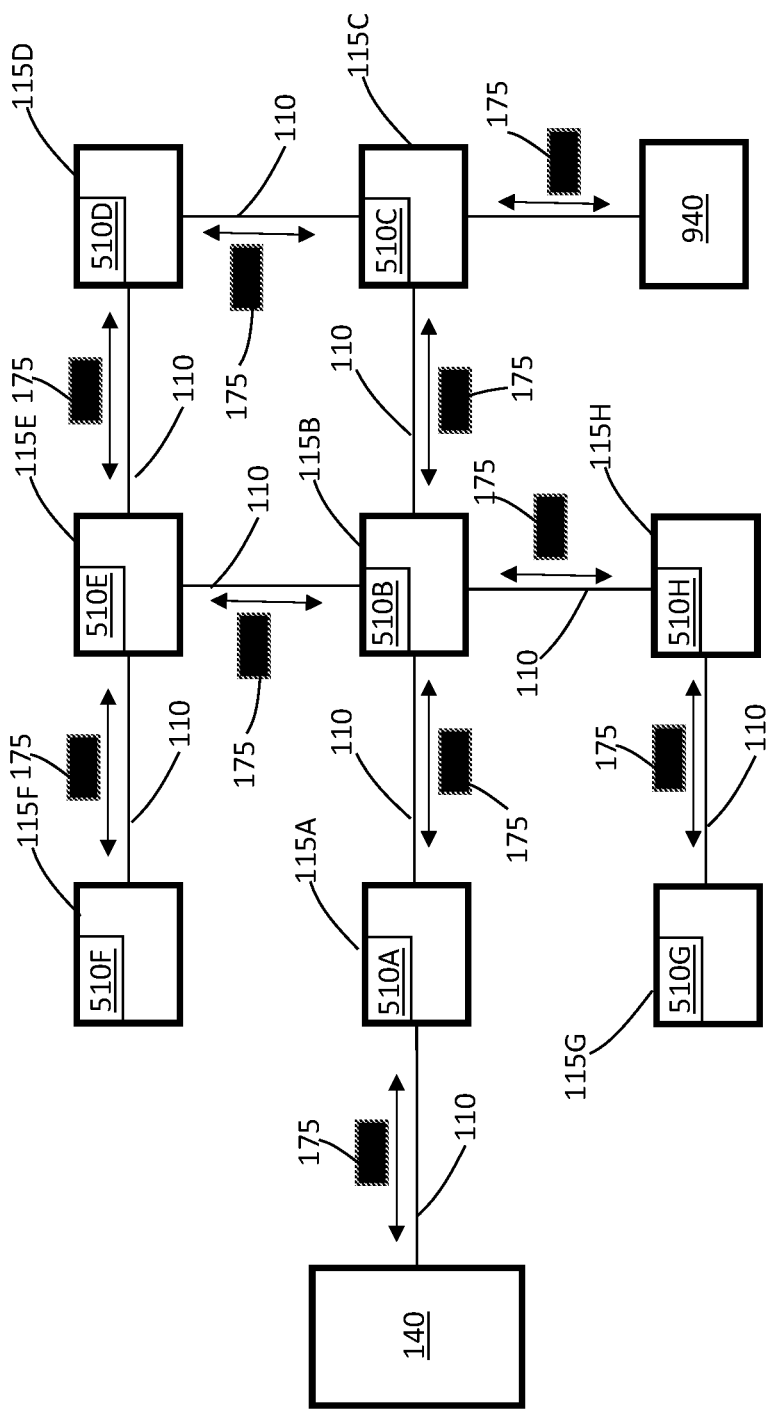

Additionally, and with reference to FIG. 9B, nodes 115A-115D form a first logical network defined by routing tables forming part of a data routing map computed by central controller 140. Similarly, nodes 115E-115H form a second logical network defined by routing tables forming part of a data routing map computed by central controller 940. This means that a data packet received at any port of any of the nodes 115A-115D that belongs to the second logical network (e.g., destined for any of nodes 115E-115H) is forwarded by that node to a default port that is different from the port on which the data packets was received.

Nodes 115A-115D forming part of the first logical network need to know that they are under the control of central controller 140 and nodes 115E-115H forming part of the second logical network need to know that they are under the control of central controller 940. This can be achieved by storing the appropriate logical network identifier in the node memory 124B of each node and having the node processor 124A compare the logical network identifier regarding a received data packets 175 (which may be found, e.g., in a header of the data packet) against the logical network identifier stored in the node memory 124B. If there is a match, then the data packet is part of the same logical network as the node and can be routed according to the routing table. Otherwise, default routing may need to be carried out.

Figure 10:
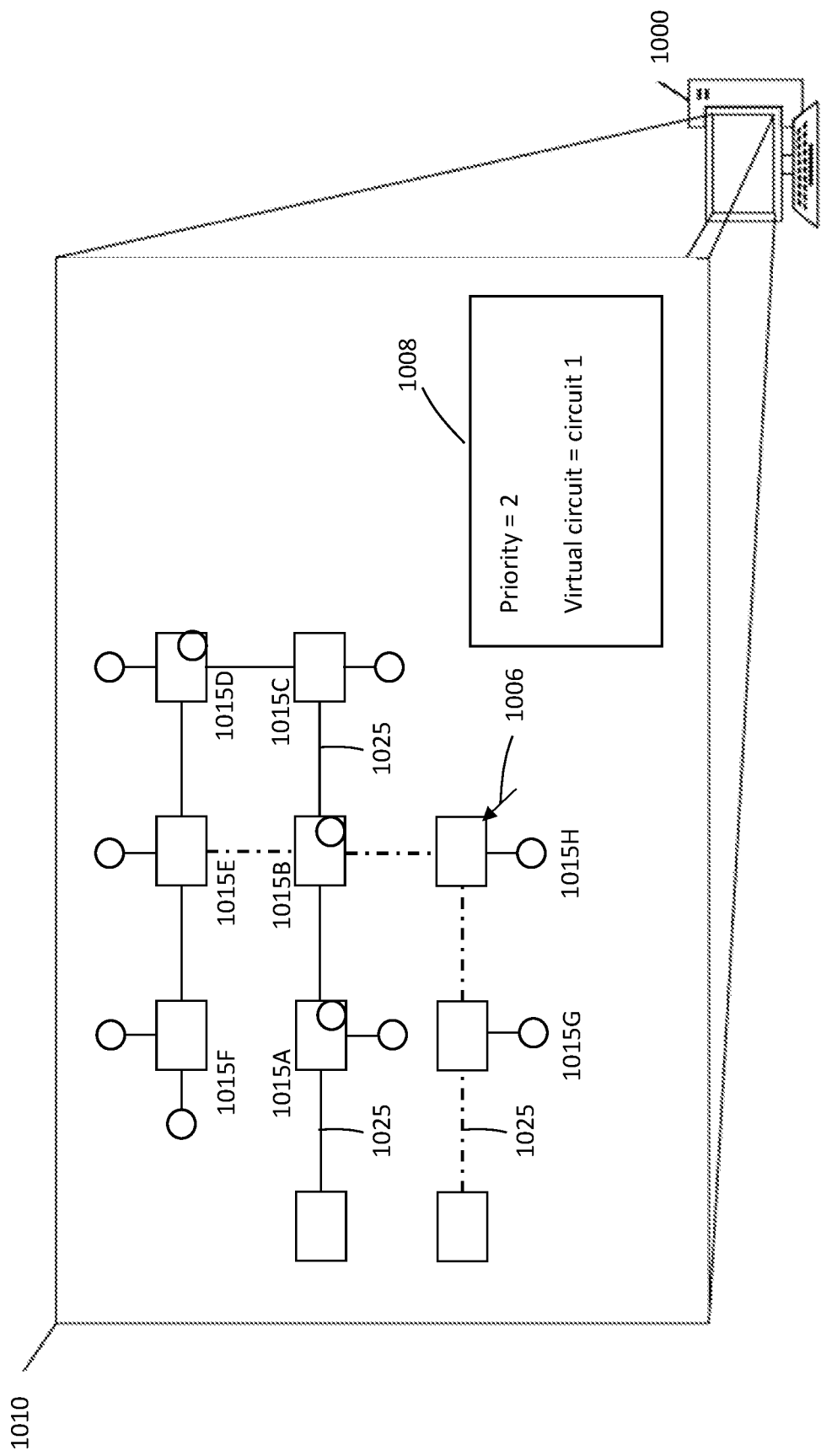
FIG. 10 illustrates a graphical user interface (GUI) that may be implemented by a user device, in accordance with a non-limiting embodiment.

With reference to FIG. 10, there is shown the user device 1000 that implements a graphical user interface (GUI) 1010 that displays on a device screen and is capable, in this embodiment, of receiving input such as via a touchscreen, mouse or keyboard. As previously mentioned, the user device 1000 may be implemented as a user console or a mobile wireless device, for example. The user device 1000 can be configured to provide an opportunity for the user to specify an interconnection topology via the GUI 1010. This can be done directly, for example, by the use of menus from which the user may select different node types, interconnection topology, power requirements and bandwidth requirements. The user device may also be configured to provide the user with an opportunity to define one or more virtual circuits via the GUI 1010. In FIG. 10, two virtual circuits are illustrated (one in solid lines and the other in dash-dot lines).

The GUI 1010 of FIG. 10 illustrates node icons 1015A-1015H a representing an interconnected topology of nodes (such as nodes 115A-115H previously described), and link icons 1025 representing hybrid data/power links (such as links 110 previously described). A cursor 1006 (in the shape of an arrow) is illustrated as positioned over node 1015H. Responsive to the user positioning the cursor 1006 over node 1015H, the user device 1000 may cause a dialog 1008 to appear on the GUI 1010. Example information that may be conveyed in the dialog 1008 include a priority level and virtual circuit identification. Further information (not shown) in the dialog 1008 may relate to a node address or identifier, node type, power requirements, bandwidth requirements or other node-specific information.

The GUI 1010 may provide an opportunity for a user to enter changes to the interconnection topology or node-specific information. For example, the dialog 1008 can include a control function that allows a user to change node-specific information. For example, the user can select a node type for each of the nodes from a predetermined set of device types that appear on a menu. In some cases, the device types may include a variety of source PoE devices, intermediate PoE devices and terminal PoE devices. Other possible user-selectable devices in the set may include power sources and central controllers. Similarly, the user can change the priority level or virtual circuit identifier. Information such as the address may or may not be modifiable by the user.

Some node-specific information may be entered by the user via the GUI 1010, but in other cases certain node-specific information may be stored in memory in association with an identifier of the node. The node-specific information may also be stored in memory in association with the device type.

The changes to the interconnection topology or node-specific information are recorded by the user device 1000 and/or the central controller 140 to which the user device 1000 is connected. This results in a new set of power consumption and switching instructions and routing tables due to ongoing execution of the power consumption determination algorithm and the data routing algorithm, as described above. The GUI 1010 may also provide the user with an opportunity to control when the power consumption and switching instructions 310A-310H and/or the routing tables 510A-510H are sent to the various nodes 115A-115H.

It should be appreciated that one or more steps of the methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although combinations of features are shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

The embodiments set forth herein represent information sufficient to practice the claimed subject matter and illustrate ways of practicing such subject matter. Upon reading the description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

What is claimed is:

1. A method for execution in a controller device, comprising:
   obtaining a priority associated with each of a plurality of network devices which are interconnected via hybrid data/power links in an interconnection topology; and
   sending respective power consumption and switching instructions to the plurality of network devices to cause direct current (DC) power to be distributed among the plurality of network devices via the hybrid data/power links;
   wherein for a particular network device associated with a lower priority than at least one other network device, a power consumption and switching instruction sent to the particular network device is configured to cause the particular network device to forward received DC power to a neighboring network device and to consume no more power than is required to operate a node controller at the particular network device for carrying out power and data routing.

2. The method according to claim 1, further comprising receiving the interconnection topology from a user device connected to the controller device.

3. The method according to claim 1, further comprising receiving information from the plurality of network devices; and determining the interconnection topology based on the information received from the plurality of network devices.

4. The method according to claim 3, further comprising participating in a low-level control protocol with the plurality of network devices to receive the information from the plurality of network devices.

5. The method according to claim 4, wherein each of the hybrid data/power links includes (i) first conductors carrying high-speed data and not carrying DC power and (ii) second conductors carrying DC power and not carrying high-speed data, wherein the low-level control protocol involves an exchange of control messages over the second conductors.

6. The method according to claim 1, further comprising obtaining the interconnection topology by accessing a data structure in a non-transitory memory, the data structure encoding the interconnection topology.

7. The method according to claim 1, further comprising obtaining the interconnection topology by processing data packets received from the plurality of network devices via the hybrid data/power links.

8. The method according to claim 6, wherein a given one of the control messages received from a given one of the plurality of network devices comprises an identifier of the given one of the plurality of network devices.

9. The method according to claim 6, wherein a given one of the control messages received from a given one of the plurality of network devices comprises an indication of one or more subtending devices connected to the given one of the plurality of network devices.

10. The method according to claim 1, further comprising obtaining a power distribution map associated with the interconnection topology by:
    determining respective power requirements for the plurality of network devices; and
    determining the power distribution map based on the determined respective power requirements for the plurality of network devices.

11. The method according to claim 10, wherein each given network device has a basic power demand for enabling operation of a node controller within the given network device, and wherein one of the determined respective power requirements for the given network device corresponds to an amount of power at least as great as the basic power demand of the given network device.

12. The method according to claim 10, wherein each given network device has a basic power demand for enabling operation of a node controller within the given network device and an internal power demand for powering a device internal to the given network device, wherein one of the determined respective power requirements for the given network device corresponds to an amount of power at least as great as the sum of the basic and internal power demands for the given network device.

13. The method according to claim 10, wherein each given network device has a basic power demand for enabling operation of a node controller within the given network device and an internal power demand for powering a device internal to the given network device and a local power demand for powering a subtending device connected to the given network device, wherein one of the determined respective power requirements for the given network device corresponds to an amount of power at least as great as the sum of the basic, internal and local power demands for the given network device.

14. The method according to claim 10, wherein each given network device has a basic power demand for enabling operation of a node controller within the given network device and an internal power demand for powering a device internal to the given network device, wherein one of the respective determined power requirements for the given network device corresponds to an amount of power greater than the sum of the basic and internal power demands for the given network device.

15. The method according to claim 10, wherein determining respective power requirements for the plurality of network devices comprises consulting a non-transitory memory that stores node-specific information.

16. The method according to claim 10, further comprising:
    determining a change in at least one of the determined respective power requirements for the plurality of network devices;

determining a new power distribution map based on the change; and causing DC power to be distributed to the plurality of network devices via the hybrid data/power links according to the new power distribution map.

17. The method according to claim 1, wherein at least one of the plurality of network devices is a source of DC power that is distributed to the other ones of the plurality of network devices in the interconnection topology.

18. The method according to claim 1, wherein two or more of the plurality of network devices are sources of DC power that is distributed to the other ones of the plurality of network devices in the interconnection topology in accordance.

19. A non-transitory computer-readable storage medium comprising instructions which, when carried out by a processor of a controller device, cause the controller device to carry out a method that comprises:

obtaining a priority associated with each of a plurality of network devices which are interconnected via hybrid data/power links in an interconnection topology; and sending respective power consumption and switching instructions to the plurality of network devices to cause direct current (DC) power to be distributed among the plurality of network devices via the hybrid data/power links;

wherein for a particular network device associated with a lower priority than at least one other network device, a power consumption and switching instruction sent to the particular network devices is configured to cause the particular network device to forward received DC power to a neighboring network device and to consume no more power than is required to operate a node controller at the particular network device for carrying out power and data routing.

20. A controller device, comprising:

a processor; and a memory storing instructions for execution by the processor;

the processor configured to execute the instructions and carry out a method that comprises:

obtaining a priority associated with each of a plurality of network devices which are interconnected via hybrid data/power links in an interconnection topology; and sending respective power consumption and switching instructions to the plurality of network devices to cause direct current (DC) power to be distributed among the plurality of network devices via the hybrid data/power links;

wherein for a particular network device associated with a lower priority than at least one other network device, a power consumption and switching instruction sent to the particular network devices is configured to cause the particular network device to forward received DC power to a neighboring network device and to consume no more power than is required to operate a node controller at the particular network device for carrying out power and data routing.

21. A method for execution in a controller device, comprising:

obtaining a priority associated with each of a plurality of network devices which are interconnected via hybrid data/power links in an interconnection topology; and sending respective power consumption and switching instructions to the plurality of network devices to cause direct current (DC) power to be distributed among the plurality of network devices via the hybrid data/power links;

wherein for a particular network device associated with a lower priority than at least one other network device, a power consumption and switching instruction sent to the particular network device is configured to cause the particular network device to forward received DC power to a neighboring network device and to consume less power than is required to simultaneously operate both a node controller of the particular network device and an internal or subtending device of the particular network device.

* * * * *